United States Patent
Peckover et al.

(10) Patent No.: US 11,520,666 B2
(45) Date of Patent: Dec. 6, 2022

(54) SYSTEMS, METHODS, AND APPARATUS FOR FAST RANSOMWARE RECOVERY

(71) Applicant: DT Labs, LLC, Carrollton, TX (US)

(72) Inventors: Douglas Peckover, Carrollton, TX (US); Robert Hirsch, San Juan, PR (US)

(73) Assignee: DT Labs, LLC, Carrollton, TX (US)

( * ) Notice: Subject to any disclaimer, the term of this patent is extended or adjusted under 35 U.S.C. 154(b) by 105 days.

(21) Appl. No.: 16/949,106

(22) Filed: Oct. 14, 2020

(65) Prior Publication Data

US 2021/0109815 A1    Apr. 15, 2021

Related U.S. Application Data

(60) Provisional application No. 62/915,493, filed on Oct. 15, 2019.

(51) Int. Cl.
*G06F 12/00* (2006.01)
*G06F 11/14* (2006.01)
*G06F 16/14* (2019.01)

(52) U.S. Cl.
CPC ...... *G06F 11/1451* (2013.01); *G06F 11/1458* (2013.01); *G06F 11/1471* (2013.01); *G06F 16/148* (2019.01)

(58) Field of Classification Search
CPC ............. G06F 11/1451; G06F 11/1458; G06F 11/1471; G06F 16/148; G06F 3/0646; G06F 3/0647; G06F 3/065
See application file for complete search history.

(56) References Cited

U.S. PATENT DOCUMENTS

| | | | |
|---|---|---|---|
| 7,937,579 B2 | 5/2011 | Peckover | |
| 7,941,376 B2 | 5/2011 | Peckover | |
| 8,261,058 B2 | 9/2012 | Peckover | |
| 8,359,271 B2 | 1/2013 | Peckover | |
| 8,543,806 B2 | 9/2013 | Peckover | |
| 8,613,107 B2 | 12/2013 | Peckover | |
| 8,826,448 B2 | 9/2014 | Peckover | |

(Continued)

OTHER PUBLICATIONS

"Summary Report: Teslstra Security Report 2019", Telstra Corporation Limited (2019), 20 pgs.

(Continued)

*Primary Examiner* — Shawn X Gu
(74) *Attorney, Agent, or Firm* — Ascenda Law Group, PC

(57) ABSTRACT

Methods and apparatus for protecting data. Backup copies of data are created in real time and restoration of this backup data is enabled. For example, backup repositories of files stored in a primary storage device of a computer system may be created by examining information concerning the files to determine critical fields therein, and storage of the critical fields to a critical storage device and of non-critical fields and tags that are substituted for the critical fields to a context storage device effected. Following compromise of the files stored in the primary storage device, accesses by applications may be directed to the context storage device, e.g., as a means of rapid failover, and/or for each file stored in the context storage device, record-by-record copying of such files to the primary storage device may be effected to restore the contents of the primary storage device.

17 Claims, 25 Drawing Sheets

Failover After Disruption

(56) References Cited

U.S. PATENT DOCUMENTS

| | | |
|---|---|---|
| 9,906,530 B2 | 2/2018 | Pike |
| 10,341,349 B2 | 7/2019 | Pike |
| 10,616,229 B2 | 4/2020 | Pike |
| 10,636,040 B2 | 4/2020 | Peckover |
| 2010/0106645 A1* | 4/2010 | Peckover ............... H04L 63/12 705/50 |

OTHER PUBLICATIONS

Davis, Jessica, "Ransomware costs on the rise, causes nearly 10 days of downtime," Cybersecurity News (Jul. 16, 2019), retrieved from: https://healthitsecurity.com/news/ransomware-costs-on-the-rise-causes-nearly-10-days-of-downtime, 5 pgs.

Duncan, Ian, "Baltimore estimates cost of ransomware attack at 18.2 million as government begins to restore email accounts," The Baltimore Sun (May 29, 2019), retrieved from: https://www.baltimoresun.com/maryland/baltimore-city/bs-md-ci-ransomware-email-20190529-story.html, 8 pgs.

Fazzini, Kate, "Louisiana declares state of emergency after cyber-criminals attack school districts," CNBC (Jul. 26, 2019), retrieved from: https://www.cnbc.com/2019/07/26/louisiana-declares-state-of-emergency-after-cybercriminals-attack-school-districts.html, 9 pgs.

Fernandez, M; et al., "Ransomware attacks are testing resolve of cities across America," The New York Times (Aug. 23, 2019), retrieved from: https://www.nytimes.com/2019/08/22/us/ransomware-attacks-hacking.html, 5 pgs.

Krebs, Brian, "Who's behind the GandCrab Ransomware?" Krebs on Security (Jul. 8, 2019), retrieved from: https://krebsonsecurity.com/2019/07/whos-behind-the-gandcrab-ransomware/, 11 pgs.

Rider, David, "Ontario cities ask feds, province for help repelling ransomware attacks," The Star (Aug. 8, 2019), retrieved from: https://www.thestar.com/news/gta/2019/08/07/ontario-cities-ask-feds-province-for-help-repelling-ransomware-attacks.html, 3 pgs.

Zelonis, Josh, "Paying a Ransom: A Viable Recovery Option?" (Jun. 12, 2019), retrieved from: https://go.forrester.com/press-newsroom/paying-ransom-a-viable-recovery-option/, 3 pgs.

\* cited by examiner

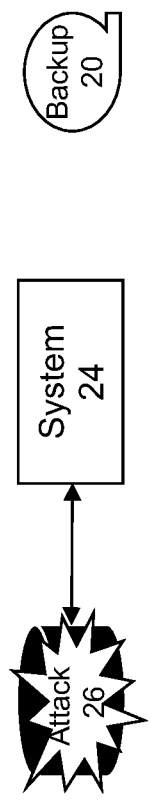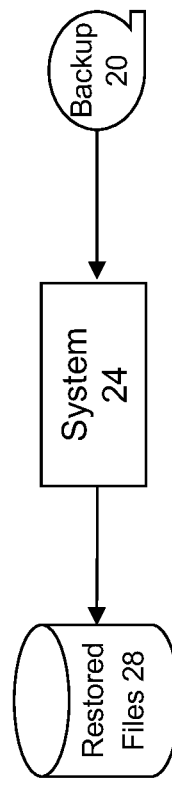

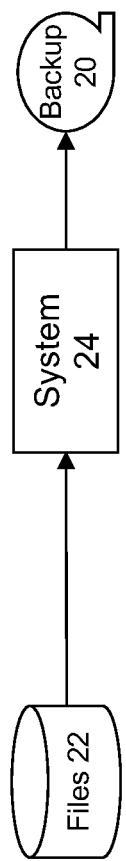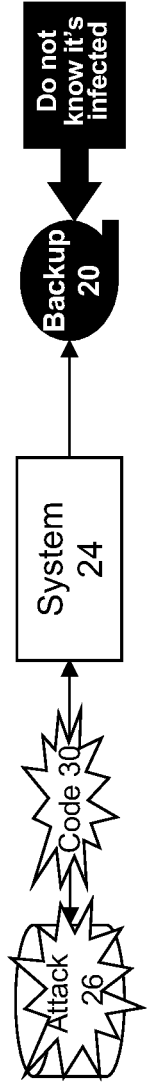
Figure 3A (PRIOR ART)
Figure 3B (PRIOR ART)
Figure 3C (PRIOR ART)
Figure 3D (PRIOR ART)

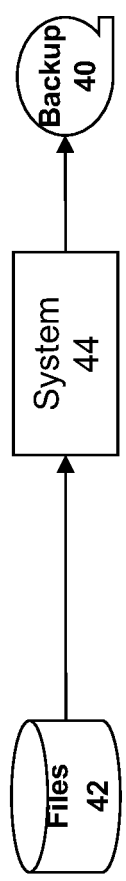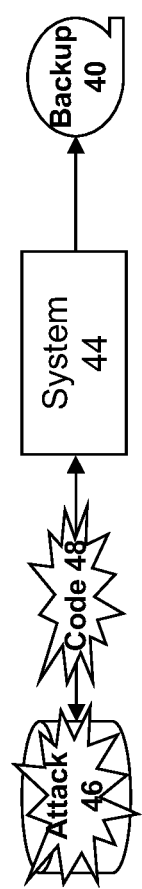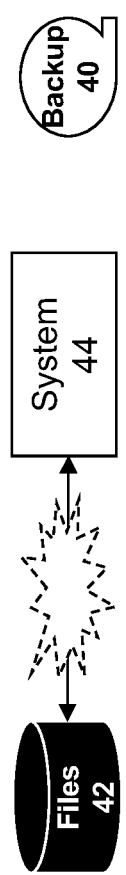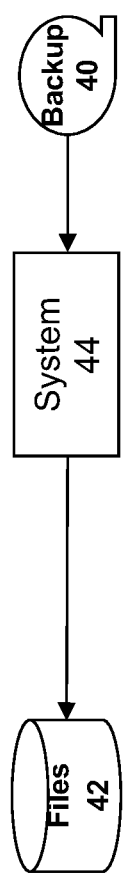

Define Instructions

Primary Update

Primary Addition

After Primary Addition

After Primary Deletion

After Alternate Primary Deletion

Context Storage Only

Failover Before Disruption

Failover After Disruption

| Table | Field | Type | Length | Critical? |
|---|---|---|---|---|
| Patient | | | | |
| | Patient Last Name | Text | 25A | ●Yes ○No |
| | Patient First Name | Text | 25A | ●Yes ○No |
| | Middle Initial | Text | 1A | ●Yes ○No |
| | Gender | Text | 1A | ○Yes ●No |
| | DOB | Numeric | | ●Yes ○No |
| | Address 1 | Text | 25A | ●Yes ○No |
| | Address 2 | Text | 25A | ●Yes ○No |
| | City | Text | 10A | ○Yes ●No |
| | State | Text | 2A | ○Yes ●No |
| | Zip | Numeric | | ○Yes ●No |
| | Balance | Numeric | | ○Yes ●No |

90

Instructions
Figure 23

92

| Device ID | Name | Type | Location |
|---|---|---|---|
| ASwe321344 | Bob Smith cell | iPhone | 12-314-543 |
| 535-458224e | Dallas remote server | SeamOS | 132.23.4356.5 |
| ID pump 23 | Process control 1433 | Bluetooth | AS-324-22 |
| ERTW-321 | Pressure gauge | Valve sensor | 32-5456-43-11-0 |
| 453-1126454-0 | Security 1 | Optical –V | Trip-95 |

Device Definitions
Figure 24

| Name | Address | DOB | Phone# | Doctor | Test | Result | Date |
|------|---------|-----|--------|--------|------|--------|------|

300

Record Before Forgotten
Figure 25A

| | | | | Doctor | Test | Result | Date |
|---|---|---|---|--------|------|--------|------|

330

Record After Forgotten
Figure 25B

US 11,520,666 B2

SYSTEMS, METHODS, AND APPARATUS FOR FAST RANSOMWARE RECOVERY

RELATED APPLICATIONS

This application is a NONPROVISIONAL of, claims priority to, and incorporates by reference U.S. Provisional Application 62/915,493, filed 15 Oct. 2019.

FIELD OF THE INVENTION

The present invention relates generally to the field of computerized information protection and, more particularly, to systems, methods, and apparatus for protecting data, especially from ransomware attacks.

BACKGROUND

So-called ransomware is generally understood as a form of malware that threatens to publish a victim's data and/or perpetually block access to it, unless a ransom (be it money or other consideration) is paid. The creation of digital currencies whose wallets are not linked to personal identities has made it easy for criminals to profit from ransomware. The City of Baltimore refused a criminal's demand for $75,000 in Bitcoin and paid an estimated $18 million to repair damage. See Ian Duncan, "Baltimore estimates cost of ransomware attack at 18.2 million as government begins to restore email accounts," The Baltimore Sun (May 29, 2019). In another example, a ransomware attack forced the State of Louisiana to declare a state of emergency. See Kate Fazzini, "Louisiana declares state of emergency after cybercriminals attack school districts," CNBC (Jul. 26, 2019).

Ransomware is a lucrative business: The criminals behind the GandCrab attacks offered ransomware-as-a-service (RaaS) and claimed to have earned more than $2 billion in ransomware payments. Many businesses pay these ransoms to avoid business interruptions caused by lack of access to their data. See Krebs on Security, "Who's behind the GandCrab Ransomware?" (Jul. 8, 2019). Technology firms are racing to protect businesses and government agencies. One report predicts that the global ransomware protection market will grow from $10 billion in 2017 to $34 billion in 2024, a compound annual growth rate of 18.44%.

Ransomware attacks may be under reported: Many firms are embarrassed to admit their staff was not properly trained or their systems were out-of-date. Others fear that admitting an attack invites future ones or exposes a weakness in their cyber defenses. A 2019 report by the Australian carrier Telstra found that just over half of surveyed executives admitted to paying a ransom.

Ransomware may not be preventable: Many ransomware attacks are initiated by and/or the product of human error, such as by clicking on an email phishing link that launches the attack. These emails vary from generic to exceptionally targeted to fool the recipient. For example, people often receive an unsolicited email with an "unsubscribe" link included therein, but there is no way of knowing if this link is safe. Because of this human factor, ransomware attacks will likely continue to be successful.

Ransomware attacks result in lost data: Referring to FIG. 2A, it is common for backup copies 20 of digital files 22 to be made (e.g., either manually or by an automated backup process running on a computer system 24) so that when a ransomware or other malware attack 26 occurs, as shown in FIG. 2B, the files can be restored 28 from the backup copies, as shown in FIG. 2C. It is important that such backups are made regularly because all work done between the last backup and the ransomware attack will likely be lost as a result of the attack. Some security experts recommend storing backup data in an offline location. This is problematic because the data is less current and retrieving the data will further delay the time required to restore operations.

Ransomware is on the rise: All reports indicate the rise of attacks. One cited an increase of 195% in the first quarter of 2019 over the previous quarter. Forrester reported an increase in ransomware attacks of over 500% between 2018 and 2019. See Josh Zelonis, "Paying a Ransom: A Viable Recovery Option?" (Jun. 12, 2019). Ransomware being offered as a service and the untraceable payment methods will continue to make this an attractive way for criminals to make money.

Soft targets are being targeted: Public sector organizations are soft targets because they're underfunded and in many cases are using hardware and software that should have long been replaced. In June 2019, a resolution was adopted at the U.S. Conference of Mayors to not pay ransoms with the hope that a united stand would provide leverage against criminals. This had minimal effect as the city of Toronto was hit by a "crippling" ransomware attack, while in Texas 23 towns were hit by a "coordinated" ransomware attack. One mayor said that local governments are "sitting ducks" for "the new terrorists of the century." See David Rider, "Ontario cities ask feds, province for help repelling ransomware attacks," The Star (Aug. 8, 2019).

Some businesses cannot afford to be offline: Some businesses like airlines, financial institutions, and hospitals, are especially at risk because they must have instant access to their data. For example, it was announced in September 2019 that an Aberdeen, Washington-based hospital was hit with a $1 million ransomware demand that forced its clinics "to operate on pen and paper." For these businesses, spending months, weeks, or even days restoring their operations is a major problem.

Insurance companies are at risk: Another industry at risk is insurance companies. The Syracuse City School District was fortunate to paid just a $50,000 deductible to restore its computer system, leaving its insurance company to pay the rest. After one insurer published the names of some of its policyholders on its website, three of them were attacked by ransomware. Kimberly Goody, a manager of financial crimes analysis for FireEye, said she expected in the future to "see some evidence that there is specific targeting of organizations that have insurance." See Fernandez et al., "Ransomware attacks are testing resolve of cities across America," The New York Times (Aug. 23, 2019).

Paying the ransom does not guarantee recovering the data: Some firms have paid a ransom and did not receive a working decryption tool. Attacks like Ryuk "actually caused greater data loss with just 87 percent of data recovered." See Jessica Davis, "Ransomware costs on the rise, causes nearly 10 days of downtime," Cybersecurity News (Jul. 16, 2019). A Telstra report says that only 77% of Australian businesses that did pay got their data back. The NotPetya attack demands payment but is in fact destructive wiper malware in the guise of ransomware that gives false hope to victims lulled into thinking payment solves their problems. The criminals who disabled Baltimore city computers demanded $76,000 in Bitcoin to release the city's files, but its mayor refused in part because "there was no guarantee the files would be unlocked."

There could be other attacks in progress: A firm has no way of knowing if other ransomware attacks are in progress, so paying a ransom may not solve its problems.

Paying the ransom makes a firm an easier target: Firms that pay ransoms are targets for more attacks. For this reason, the FBI recommends that firms not pay these ransoms.

More sophisticated attacks are being developed: Rather than infecting just production files, criminals are shifting their focus to infecting backup files. The reason is simple—this significantly increases the chances of a ransom being paid. Referring now to FIG. 3A, a regular backup process, in which backup copies 20 of digital files 22 are made (e.g., either manually or by an automated backup process running on a computer system 24), is illustrated. As shown in FIG. 3B, in a typical ransomware attack, files 22 are infected and code 30 that hides this infection is inserted so that files 22 appear correct but are in fact infected. As a result, the backup files 20 also become infected when the backup process runs on system 24, however, the infected nature of the backup files is unknown. Then, as shown in FIG. 3C, the inserted code self-destructs and the infected files 22 cannot be accessed. Resorting to the backup files 20 is of no avail because, as shown in FIG. 3D, all of the backup files 20 since the start of the original attack are also infected resulting in severe or catastrophic interruptions.

In addition to such ransom attacks that infect backup files, new demands include a "delay tax" that penalizes companies that do not pay the ransom immediately. Moreover, according to some experts, the ransomware business is so lucrative that the criminals are pouring some of their profits back into new research and development efforts to make new attacks even more damaging.

SUMMARY OF THE INVENTION

The present invention provides methods and apparatus for protecting data. In various embodiments, backup copies of data are created in real time and rapid restoration of this backup data is enabled. In one such embodiment, backup repositories of files stored in a primary storage device of a computer system are created by examining information concerning said files to determine critical fields in said files, creating automated backup process instructions that segregate storage of said critical fields to a critical storage device and storage of non-critical fields and tags that are substituted for said critical fields in said files stored in said primary storage device to a context storage device, and executing said instructions to effect storage of said critical fields to said critical storage device and storage of said non-critical fields and said tags to said context storage device. Creating the automated backup process instructions may include reading the files and, for each file, determining whether the file's content can be secured.

Execution of the instructions, for example by as part of an application that oversees the backup process running on a computer system, may include, for each respective instruction and for each respective file, creating a corresponding context storage file in said context storage device, examining each record in the respective file and, for each respective record, examining each field in the respective record. If the respective instruction identifies the respective field as a critical field, its field contents are added to the critical storage device and the field contents in the respective field of the respective record in the respective file stored in said primary storage device are replaced with one of the tags. Otherwise, if the respective field is not a critical field, examination of the next field in the respective record in the respective file stored in said primary storage device continues. When all fields of the respective record in the respective file stored in said primary storage device have been examined, if any of the fields of the respective record in the respective file stored in said primary storage device have had field contents replaced by said tags, the respective record in the respective file stored in said primary storage device are updated. Thereafter, or if none of the fields of the respective record in the respective file stored in said primary storage device have had field contents replaced by said tags, the respective record (including any tags that replaced critical field contents) is added to the corresponding context storage file.

As indicated, the backup process continues in real time such that for each access of a file stored in the primary storage device by an application, if a respective record of the respective file includes one or more tags, the tags are stored in memory, each field of the respective record is examined, and for each respective field if it contains a tag, that tag is used to retrieve corresponding critical field content from the critical storage device. That critical field content is then stored in the subject field of the record of the file in the primary storage device.

Following such an access, for each field of the subject record in the subject file that included a tag, the corresponding critical field content in the critical storage device is updated and the tags in the subject record of the subject file in the primary storage device are restored from memory.

The backup process further continues such that for each access of a file stored in the primary storage device by an application that creates a new record in the respective file, each field of the new record in the respective file is examined and, for each such field of the new record that includes critical field content, that critical field content is added to the critical storage device, and is replaced by a tag in the new record of the file in the primary storage device. Moreover, the new record with any such tags is copied or otherwise stored to the corresponding file in the context storage device.

Further, for each access of a file stored in the primary storage device by an application that deletes a record in the respective file, that record may be deleted from the primary storage device and from a corresponding respective record of a corresponding respective file in the context storage device, but the critical field contents of the record in the critical storage device may be maintained. Alternatively, for each such access, the record may be examined for any tags and, for each respective tag, the corresponding critical field content stored in the critical storage device may be deleted (provided the tag is not referenced by another record stored in the primary storage device that is not being deleted) in addition to the record being deleted from the primary storage device and from a corresponding file in the context storage device.

Following any compromise of files stored in said primary storage device, accesses by applications may be directed to the context storage device, e.g., as a means of rapid failover. Alternatively, or in addition, for each file stored in the context storage device, record-by-record copying of each such file to the primary storage device may be effected by an application to restore the contents of the primary storage device.

These and further embodiments of the invention are discussed in detail below.

BRIEF DESCRIPTION OF THE DRAWINGS

The present invention may be better understood by referring to the following description in conjunction with the accompanying drawings, in which:

FIG. 2A illustrates a conventional backup process for digital files.

FIG. 2B illustrates a malware attack following the conventional backup process shown in FIG. 2A.

FIG. 2C illustrates a conventional file restoration process following a malware attack.

FIG. 3A illustrates a conventional backup process in accordance with one embodiment of the present invention.

FIGS. 3B-3D illustrate consequences of a hidden malware attack that results in infection of backup files.

FIGS. 4A-4D illustrate an improved backup process in accordance with one embodiment of the present invention that minimizes consequences of a hidden malware attack.

FIG. 23 is a table that illustrates examples of Instructions with file and field definitions and a Critical Flag in accordance with one embodiment of the present invention.

FIG. 24 is a table that illustrates examples of Device Definitions that contain descriptions and locations of Device files in accordance with one embodiment of the present invention.

FIG. 25A illustrates an example of an electronic record before being sanitized according to a Right to be Forgotten request in accordance with one embodiment of the present invention.

FIG. 25B illustrates the electronic record of FIG. 25A after it is sanitized according to a Right to be Forgotten request in accordance with one embodiment of the present invention.

DETAILED DESCRIPTION

Figure 1:
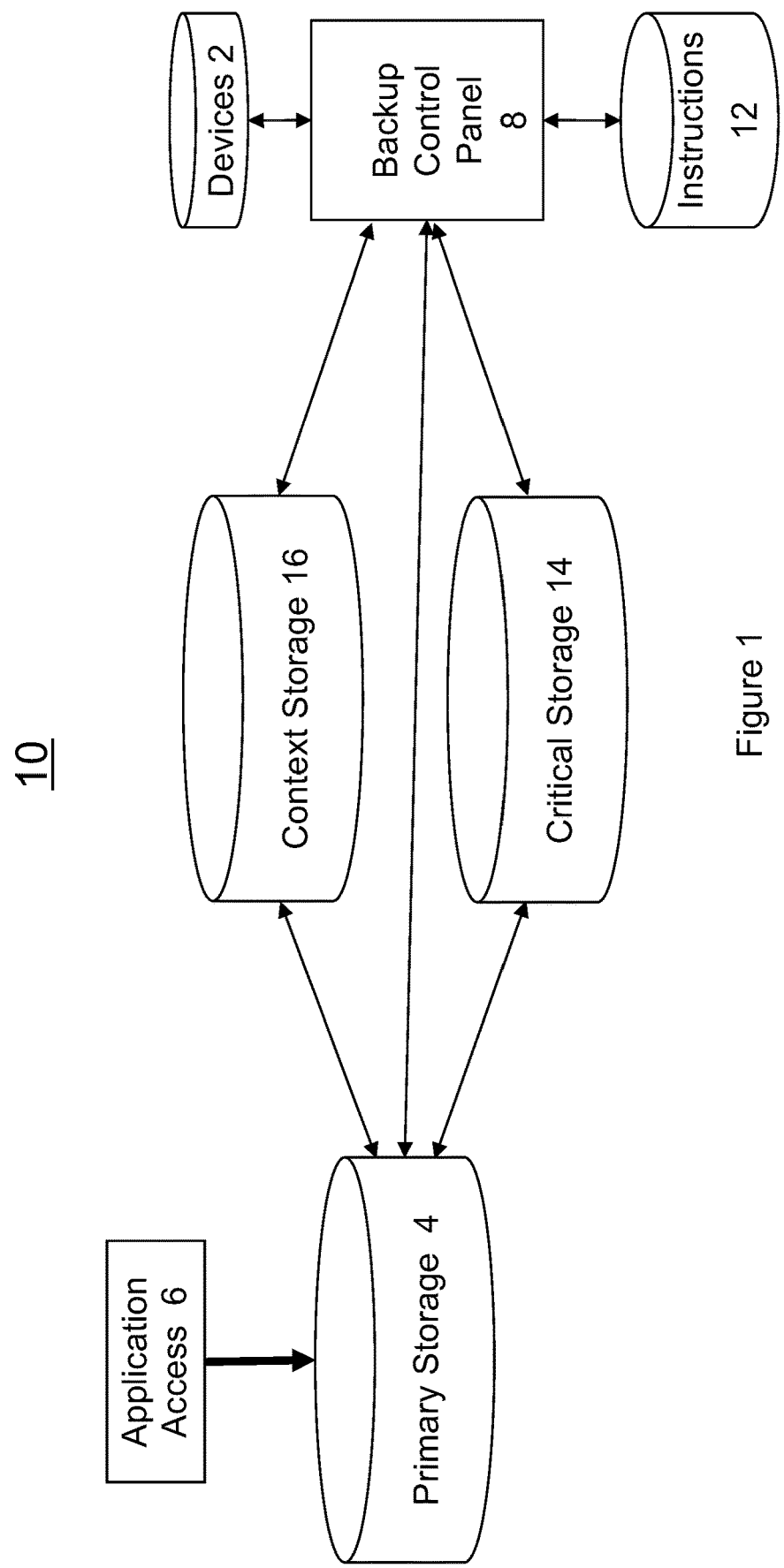
FIG. 1 illustrates schematically backup and restoration processes in accordance with one embodiment of the present invention.

Recognizing the threat posed by ransomware and attacks employing such malicious code, the present inventors have determined that what are needed are new data backup and restoration solutions. Referring now to FIGS. 4A-4D, in embodiments of the present invention backups 40 are created in such a way as to protect files 42 so that a ransomware attack 46 does not infect the backup 40. As with conventional backup processes, backup copies 40 of digital files 42 are made (e.g., either manually or by an automated backup process running on a computer system 44). This time, however, when files 42 are infected as a result of an attack 46 and code 48 that hides this infection is inserted, the backup files 40 do not become infected. Consequently, even though the inserted code self-destructs such that files 22 can no longer be accessed, the unaffected backup files 40 are readily available and system 44 can be restored.

To provide this resiliency against attack, backups are preferably made in real time so that no data up to the instant of an attack is lost. This includes all data stored on all devices, including Internet of Things (IoT) devices. In addition, the structure of the data, such as tables in a database, formatting and macros for a spreadsheet, location and access rights of operating system scripts, etc., is stored. So too are configuration files, key files, setup files, and other files necessary for the operations of a system protected. This enables fast recovery times and minimizes disruptions. In various embodiments then, the present invention provides methods and apparatus for protecting data. It does this by creating backup copies of data in real time and by enabling a rapid restoration of this backup data.

Major disruptions to computer systems cannot be prevented because of fires, floods, acts of God, etc. The same may be true for ransomware attacks because they can be launched by a simple human error, such as an employee clicking on a link in an email. The present invention therefore offers real-time backups that enable a fast way to recover any major disruption with the minimal loss of data.

Referring to FIG. 1, an example of a computer system 10 (also known as a computer environment) is illustrated. Note, not all elements of a computer system on which an embodiment of the present invention may run are shown. Instead, the figure is limited to those elements of such a system as are thought best to help illustrate the nature and operation of the present methods and apparatus. In the example of computer system 10, records concerning various Devices 2 (e.g., processor-based devices) that operate on and with data stored in a Primary Storage 4 (e.g., one or more dynamic and/or static storage devices such as memories, hard drives, etc.) via one or more application programs 6 are maintained. In accordance with the present invention, a Backup Control Panel 8 permits an Operator (e.g., a user and/or administrator of computer system 10) to view and select files (e.g., databases, application files such as Word® documents, Excel® documents, Adobe® documents, etc., unformatted text documents, IoT files, programs, operating systems, drivers, videos, music, and any other type of digital content) stored in Primary Storage 4 that need to be backed up, and optionally to specify critical fields in these files that require special processing. Such identification results in the creation of suggested Instructions 12. In some cases, the Instructions 12 are created automatically through automated scanning or other review of the files stored in Primary Storage 4, and presented to the Operator via the Backup Control Panel 8 for the Operator's review and revision, as needed. Once the Instructions are approved, the backup process is launched. During the backup process, fields in the files stored in Primary Storage 4 are examined and critical ones of the fields identified. Critical field content is stored in Critical Storage 14. All files in Primary Storage 4 are backed up to files in Context Storage 16 on a record by record basis. Context Storage 16 contains all data in Primary Storage 4 that is not critical and does not require special processing. Critical Storage 14 contains all data in Primary Storage 4 that does require special processing. The backup procedure is explained in greater detail with reference to FIGS. 5-8.

Before turning to a description of the backup procedure, the reader should recognize that Backup Control Panel 8 may be a user interface of a computer system or other processor-based system that affords an Operator control over the backup procedures described herein. As such, Backup Control Panel 8 may execute on a computer system that selectively activates or otherwise executes the backup procedures described herein, which backup procedures are stored as processor-executable instructions on one or more processor-readable storage mediums accessible to processing elements of the computer system. For example, such a backup procedure may be stored in or on a tangible, processor-readable storage medium, such as, but not limited to, any type of disk including solid state or floppy disks, optical disks, compact disk read only memories (CD-ROMs), and magnetic-optical disks, read-only memories (ROMs), flash drives, random access memories (RAMs), erasable programmable read only memories (EPROMs), electrically erasable programmable read only memories (EEPROMs), flash memories, other forms of magnetic or optical storage media, or any type of media suitable for storing such instructions. The processes (also referred to as routines) presented herein are not inherently related to any particular computer system, processor or other apparatus and so may be expressed in any of a number of processor-readable computer languages and/or instruction sets. Of course, the invention can be practiced with computer system configurations other than those particularly described below, including systems that comprise hand-held devices, multiprocessor systems, microprocessor-based electronic devices, digital signal processor-based devices, networked computer systems, minicomputers, mainframe computers, personal computers, and the like, and it should be recognized that the examples presented herein are used merely for purposes of illustration. The invention can also be practiced in distributed computing environments where tasks are performed by computer processing devices that are remote to one another, either physically and/or logically, and are linked through one or more communications networks. The required structure for a variety of these systems will appear from the description below.

In general, a computer system on which backup procedures as described herein may execute will include one or more processors communicatively coupled to a communication bus or busses so as to access one or more storage devices, e.g., memories (both static and dynamic), disks, etc., and the instructions stored thereon, as discussed above. The computer systems may also include one or more displays communicatively coupled to the processor(s), for example which may display elements of the Backup Control Panel 8. User input devices such as a keyboard, mouse, and/or other cursor control device may also be provided. Also included may be one or more communication interfaces and associated modems for inter-computer communication via one or more computer networks.

In one embodiment of the invention, the backup process discussed below begins with execution of the Define Instructions routine discussed in connection with FIG. 5. Once Instructions have been determined, the backup process executes the Process Instructions routine described in connection with FIGS. 6-8. As Applications access information stored in a Primary Storage, the backup process executes the Primary Update routine described in connection with FIGS. 9 and 10, the Primary Addition routine described in connection with FIGS. 11 and 12, and the Primary Deletion routine described in connection with FIGS. 13-14. In some cases, the Alternative Primary Deletion routine described in connection with FIGS. 15 and 16 may be executed in lieu of or in addition to the Primary Deletion routine described in connection with FIGS. 13-14. In the event of a ransomware or other attack, or other corruption of the information stored in the Primary Storage, a recovery process may execute the Primary Storage Recovery routine discussed below in connection with FIGS. 17 and 18. In other embodiments of the invention, the recovery process may execute the Context Storage Only routine (e.g., if no critical data is present, in which case no Critical Storage is required)) discussed below in connection with FIG. 19 and/or the Critical Storage Only routine (e.g., if only critical data exists, in which case Context Storage is still necessary although it stores only Tags) discussed below in connection with FIG. 20. Examples of various system configurations for execution of these routines are described with reference to FIGS. 1, 21, and 22, and the tables provided in FIGS. 23 and 24 show examples of Instructions and Device Definitions, respectively, that are used in accordance with embodiments of the present invention.

In the description of the backup and restore processes below, reference is made to files and records. A file, as the term is used herein, is a basic unit of storage and may be regarded as a collection of records. Several of the routines herein are described as operating record-by-record, but may also operate field-by-field. Examining a file record-by-record and/or field-by-field may include examining the record and/or field, as appropriate, for executable code. The presence of executable code may be taken as an indication that the file has been compromised in some fashion. References to record-by-record analysis or the like should be understood as also indicating field-by-field analysis.

Figure 5:
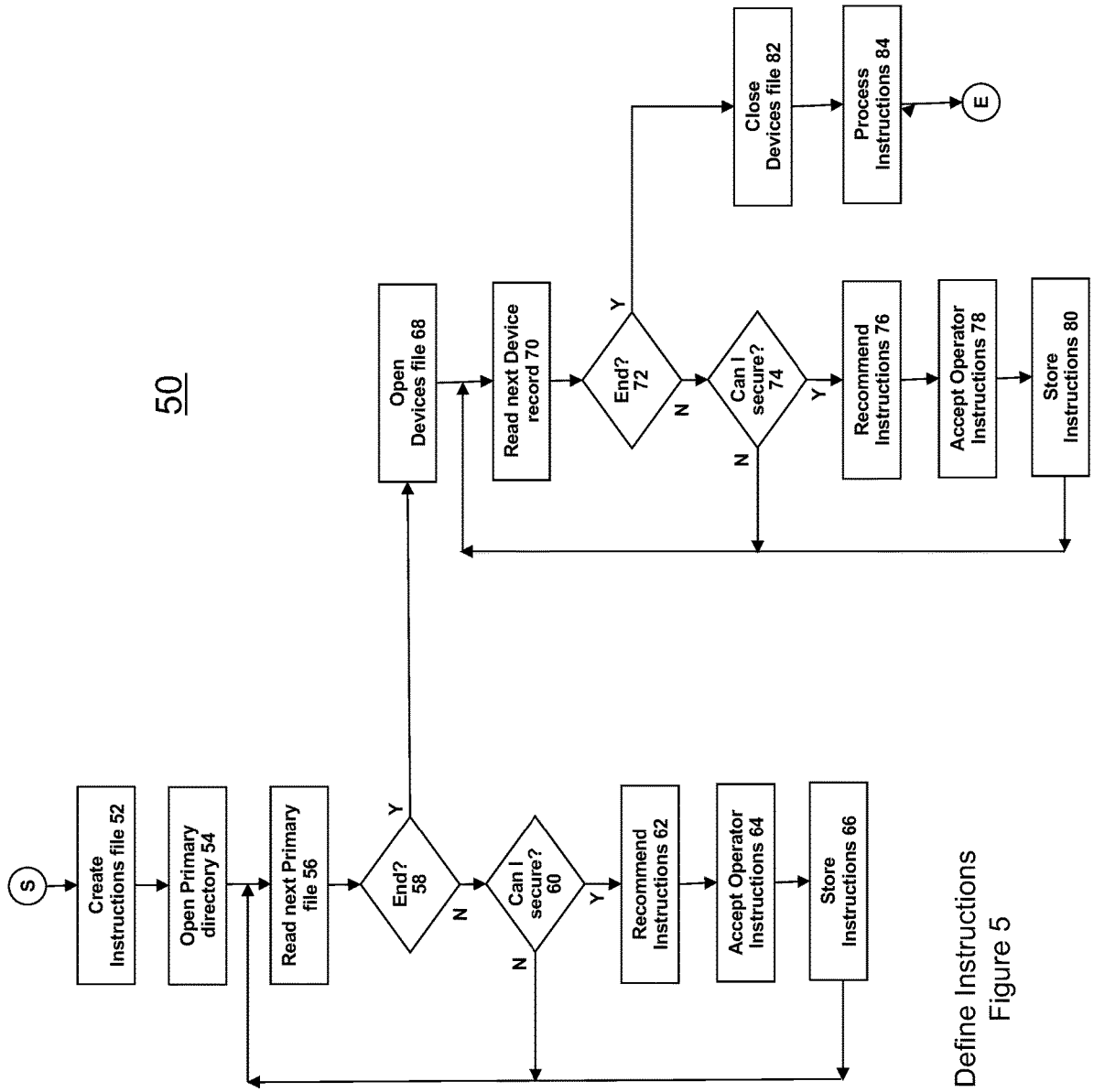
FIG. 5 is a flowchart illustrating a Define Instructions routine in accordance with one embodiment of the present invention.

Beginning with FIG. 5 then, a Define Instructions routine 50 of a backup process according to one embodiment of the invention is shown. This routine handles scanning of files and preparations for an initial backup from Primary Storage 4 to Context Storage 16 and/or Critical Storage 14.

At 52, an Instructions file is created and at 54 a Primary Storage directory is opened. The Instructions file will be a repository for the suggested Instructions 12 discussed above. The Primary Storage directory is a directory of the files stored in Primary Storage 4. In this context, a directory is a catalog for filenames stored on Primary Storage 4; that is, a way of organizing and grouping the files so that a user is not overwhelmed by a long list of them. The directory may be organized in a tree-like structure in which an uppermost or root directory exists, and other, subdirectories are present. Within the directory, filenames can be viewed and ordered in various ways, for example, alphabetically, by date, by size, or as icons in a graphical user interface. Within Primary Storage 4, a file is the basic unit of storage that enables computer system 10 to distinguish one set of information from another, and is a complete, named collection of information, such as a program, a set of data used by a program, or a user-created document. A file name is a set of letters, numbers, and/or allowable symbols assigned to a file to distinguish it from all other files in the Primary directory.

Each file in the Primary directory is examined (56-66). This involves reading each file 56 until none remain 58. For each file, if the file content can be secured 60, the Operator is shown recommended Instructions 62 (e.g., via the Backup Control Panel 8), examples of which are shown in the Instructions table 90 in FIG. 23, including fields that may be critical. The Operator may accept, change, or delete these Instructions 64. In one preferred embodiment, this includes automatically examining field contents to determine if it should be considered to be Critical. Thereafter, the Instructions are stored 66 in the Instructions file.

In one preferred embodiment, Devices files are also read (68-80) to learn more about the location of additional files. These could include RFID tags, IoT devices, remove systems, etc. As shown in table 92 in FIG. 24, a Device Definitions file may contain detailed information such as a device identifier (ID), name, device type, device location, etc. Each record in the Devices file is examined 70, 72. If the device content can be secured 74, the Operator is again shown recommended Instructions 76 including fields that may be critical and the Operator accepts, changes, or deletes these Instructions 78. Again, in one preferred embodiment, this includes automatically examining field contents to determine if it should be considered to be Critical. The resulting Instructions are stored 80 in the Instructions file.

At completion of the Define Instructions routine, the Devices file is closed 82, and the Instructions are processed 84.

Figure 6:
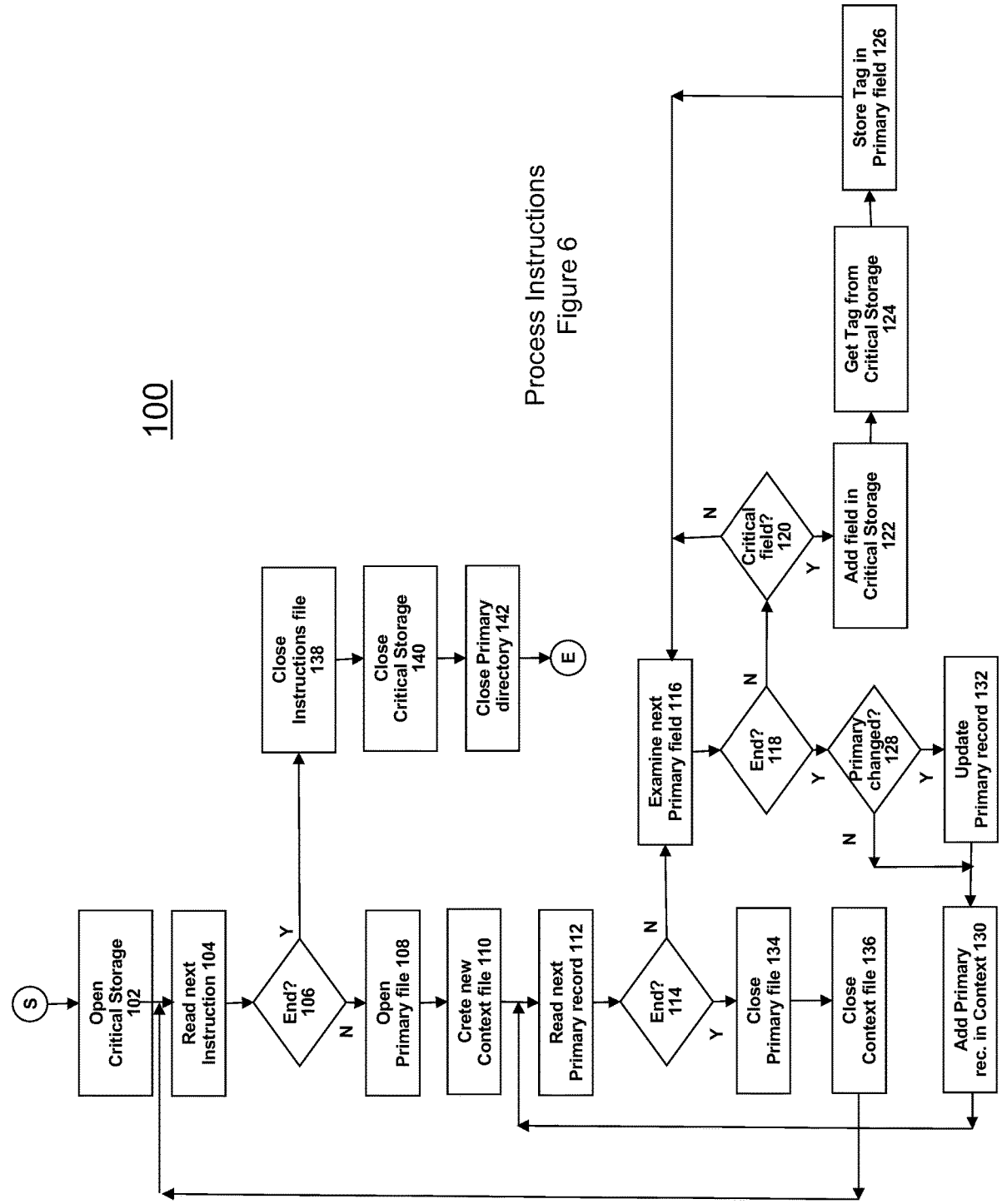
FIG. 6 is a flowchart that illustrates a Process Instructions routine in accordance with one embodiment of the present invention.

Referring now to FIG. 6, a Process Instructions routine 100 according to one embodiment of the invention is shown. This routine permits the creation of the Context Storage 16 and Critical Storage 14, and the subsequent backup of the contents of Primary Storage 4 thereto.

Process Instructions routine 100 begins by opening Critical Storage 102. For each Instruction 104, 106, a Primary file is opened 108 and a corresponding Context file is created 110. Each record in the Primary file 112 and each field in the record 116 is examined. If the Instruction identifies the field as a Critical field 118, 120, its field contents are added to the Critical Storage 122 in exchange for a Random Tag from the Critical Storage 124 that replaces the Critical field in the Primary record 126. Otherwise, if the field is not a Critical field 120, the next field in the current Primary file is examined 116. This process repeats for each field in the current Primary file under review 118. When all fields of the current Primary file have been examined, 118, if the Primary record has changed by having Critical fields replaced by Tags 128, the record is updated in the Primary file 132. Thereafter, or if no fields of the current Primary file have been changed 128, the Primary record is added to the Context file 130. This process repeats for all records in the Primary file and all Instructions in the Instructions file. When all records in the Primary file have been reviewed 114, the Primary file is closed 134, as is the Context file 136. When all Instructions have been reviewed 106, the Instructions file is closed 138, and the Critical Storage and Primary directories are closed 140, 142. Note, in the event a file is infected, step 108 (open Primary file) will fail (most ransomware attacks, at their core, prevent this kind of access to a file). In some cases, for example if only certain records are infected, step 112 (reading a next Primary record) should fail. Or, if only certain fields are infected, step 116 (examine next Primary field) should fail. Both of steps 112 and 116 include validation processes to ensure that the data being accessed is not encrypted or otherwise compromised. Any of these failures is an indication that the subject file is corrupted in some fashion and should not be replicated.

Figure 7:
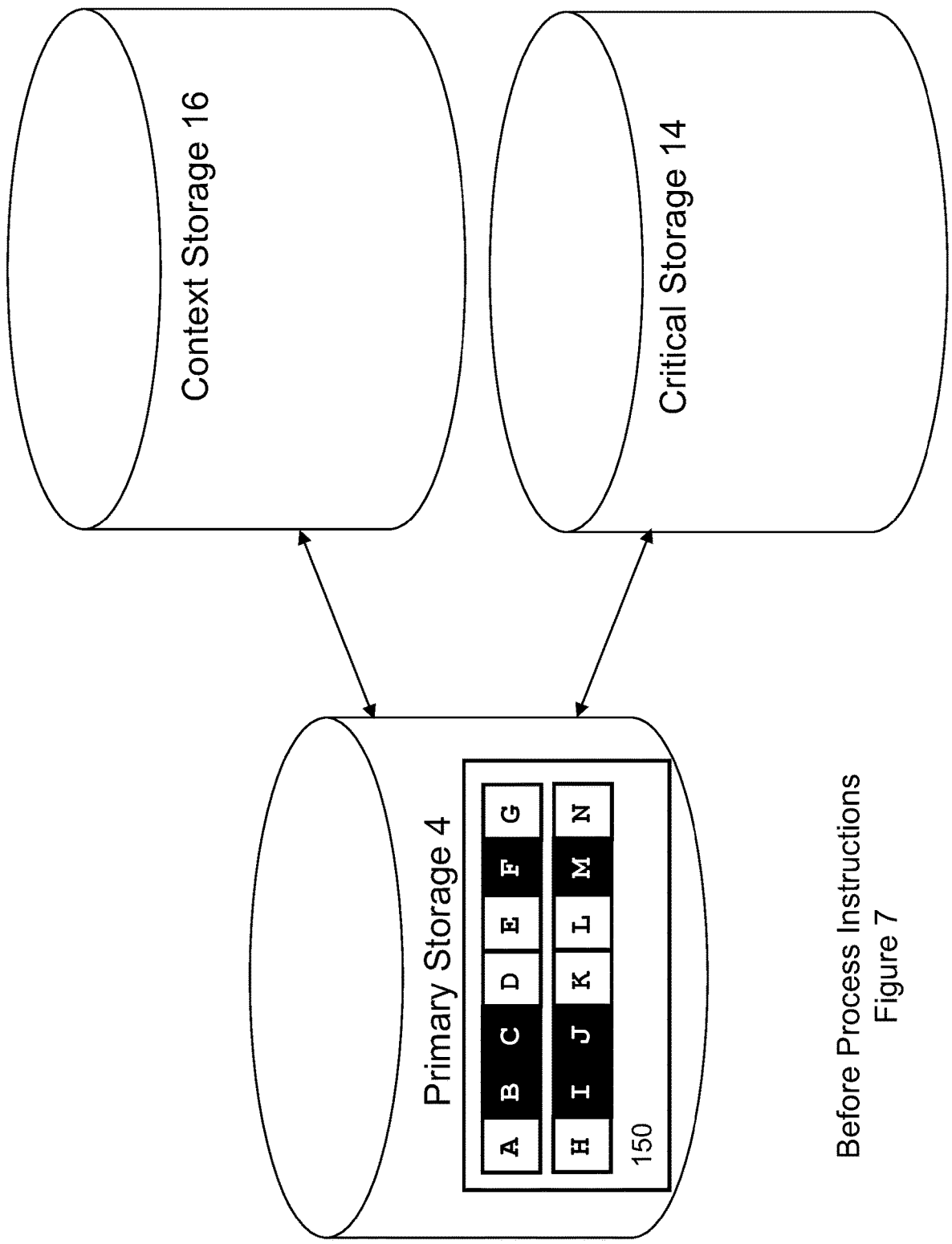
FIG. 7 illustrates a system state existing before execution of the Process Instructions routine in accordance with one embodiment of the present invention.
Figure 8:
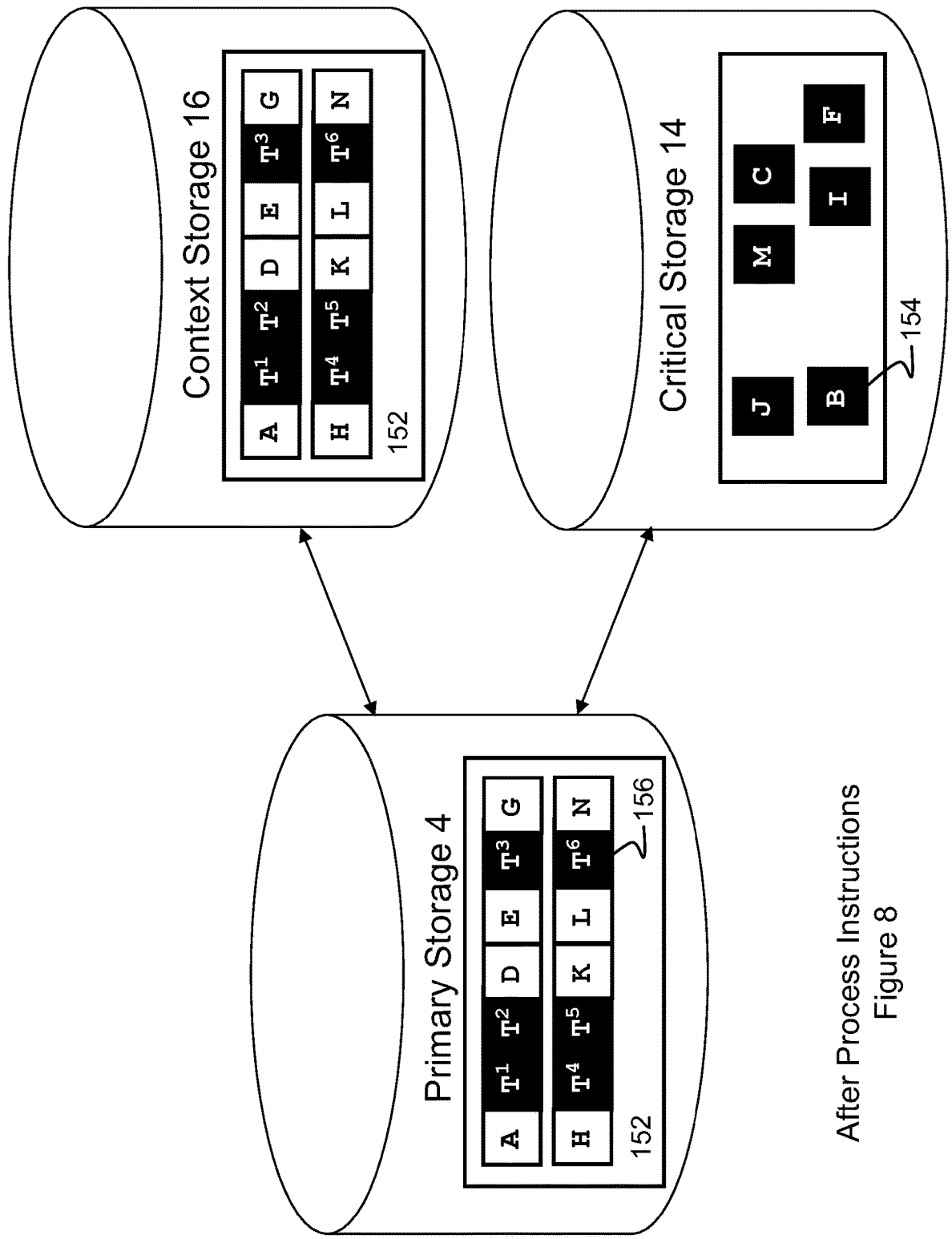
FIG. 8 illustrates a system state existing after execution of the Process Instructions routine in accordance with one embodiment of the present invention.

Referring now to FIGS. 7 and 8, an example of the effect of executing Processing Instructions routine 100 is shown. For this example, assume that only a single file 150 is stored in Primary Storage 4. As illustrated in FIG. 7, at the outset, Context Storage 16 and Critical Storage 14 contain no backup data.

FIG. 8 illustrates the result after Processing Instructions routine 100 executes. Critical fields 154 of file 150 in Primary Storage 4 (shown in black) have been randomly stored in Critical Storage 14 in exchange for Tags 156 (e.g., $T^1$-$T^6$), which are updated in the Primary records to create a new file 152. These records, in the guise of file 152, are then are individually copied into Context Storage 16 so that all files and records in Context Storage 16 are exact copies of files and records in Primary Storage 4. Note that in this preferred embodiment, this has been done without actually copying the files as this could also copy an infection. To avoid such a situation, the present invention does not use operating system file, directory, drive copy, or similar commands. Instead, by performing operations that examine (e.g., open, read, etc.) the files, the present invention ensures that only uninfected files are duplicated in Context storage 16. The ability to perform such an examination of the file as exists in Primary Storage 4 is an indication the file is not infected at the time the duplication is performed.

Primary Content, that is files stored in Primary Storage 4, is now ready for a production environment in which it will undergo updates, additions, and deletions. The steps to synchronize and therefore backup such Primary Content are discussed next.

Figure 9:
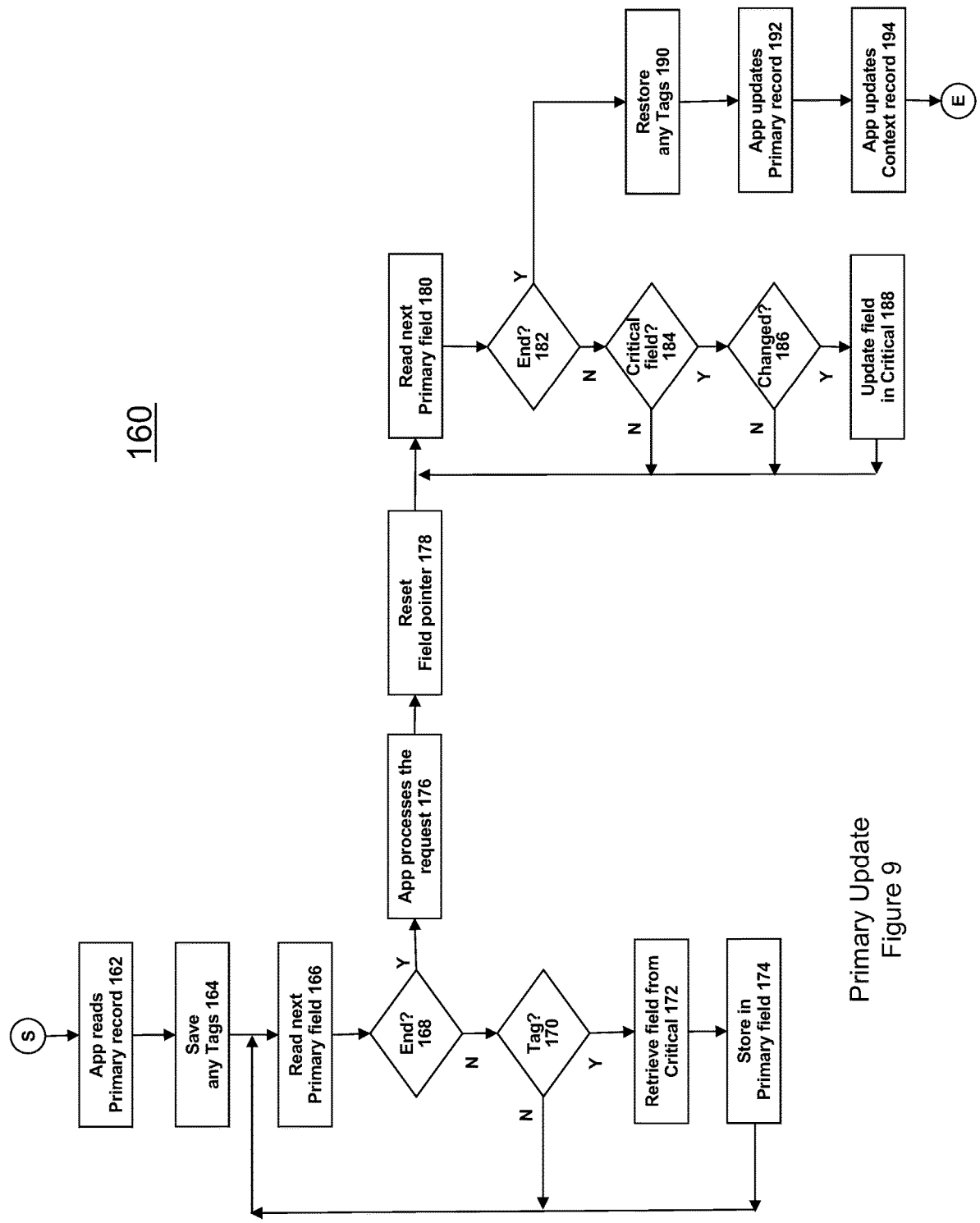
FIG. 9 is a flowchart that illustrates a Primary Update routine in accordance with one embodiment of the present invention.

Referring to FIG. 9, a Primary Update routine 160 is shown. In this procedure, an Application 6, such as a healthcare patient maintenance program, accesses (e.g., reads) the Primary record to be updated 162. If the record contains Tags, those Tags are stored in memory 164. Each Primary field in the record is examined 166, 168. If it contains a Tag 170, that Tag is used retrieve the corresponding Critical field from Critical Storage 172 and store it in the Primary field 174. When all Primary fields have been reviewed 168, the Application processes the request 176 and a field pointer is reset 178 so that the record's fields can be re-examined.

Figure 10:
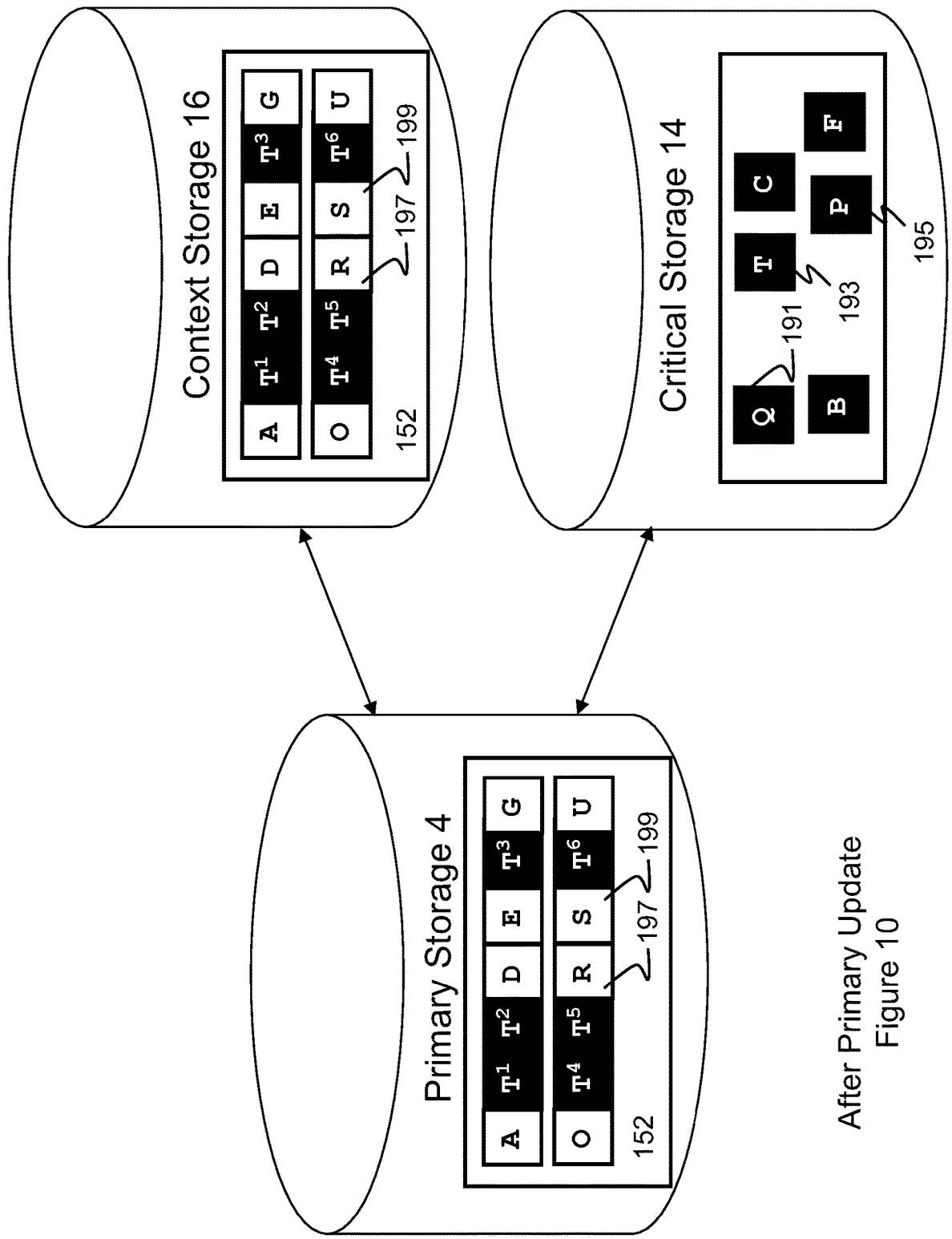
FIG. 10 illustrates a system state existing after execution of the Primary Update routine in accordance with one embodiment of the present invention.

Accordingly, each Primary field is again examined 180, 182 and if a Critical field has changed 184, 186, the corresponding field in Critical Storage is updated with the new contents 188. Any Tags stored in memory are restored 190 into their original Critical fields in the Primary record, and the Application updates the Primary record in Primary Storage 197 and in Context Storage 194. FIG. 10 shows an example of the effect of processing the record shown in FIG. 8 by the Primary Update routine 160. All fields in the Primary Storage record 152 have updated both in Critical Storage 14, and the corresponding record in Context Storage 16. This includes the changes in Critical records 191, 193, and 195, and Primary records 197 and 199.

Figure 11:
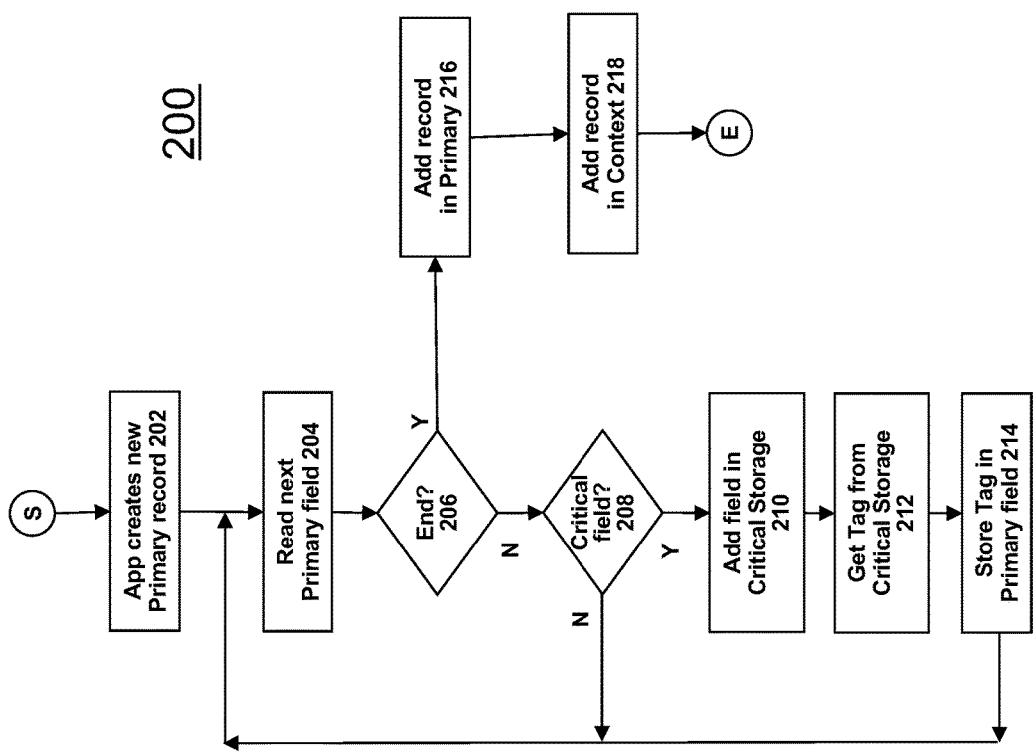
FIG. 11 is a flowchart that illustrates a Primary Addition routine in accordance with one embodiment of the present invention.

Referring now to FIG. 11, a Primary Addition routine 200 is illustrated. In this case, an Application 6 creates a new Primary record 202 and each Primary field in the new record is examined 204, 206. In one preferred embodiment, if the Instructions identify a field as Critical 208, its contents are added to Critical Storage 210 in exchange for a Random Tag from Critical Storage 212 that replaces the Critical field in the Primary record 214. The new record is added in Primary Storage 216 and Context Storage 218.

Figure 12:
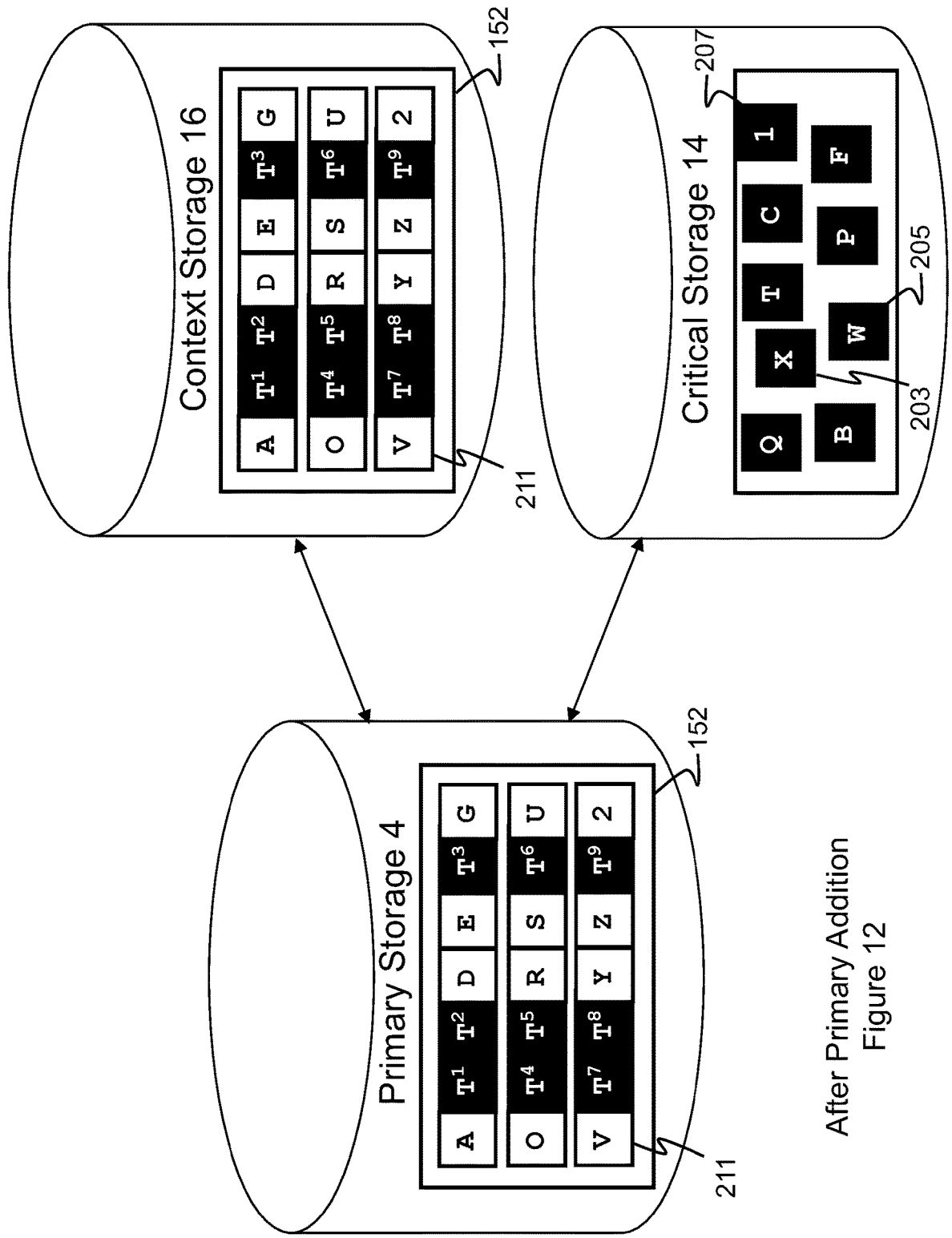
FIG. 12 illustrates a system state existing after execution of the Primary Addition routine in accordance with one embodiment of the present invention.

FIG. 12 shows an example of the effect of processing the record shown in FIG. 10 by the Primary Addition routine 200. The Critical fields 203, 205, 207 from the Primary Storage record 211 have been added in Critical Storage 14 and the new Primary Storage record 211 is added to Context Storage 16 with the Tags $T^7$, $T^8$, and $T^9$ that replaced the Critical fields 203, 205, 207.

Figure 13:
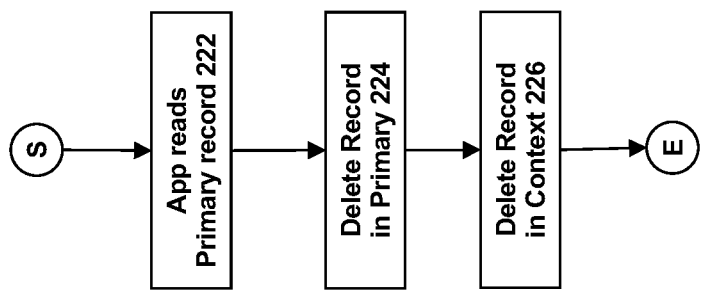
FIG. 13 is a flowchart that illustrates a Primary Deletion routine in accordance with one embodiment of the present invention.
Figure 14:
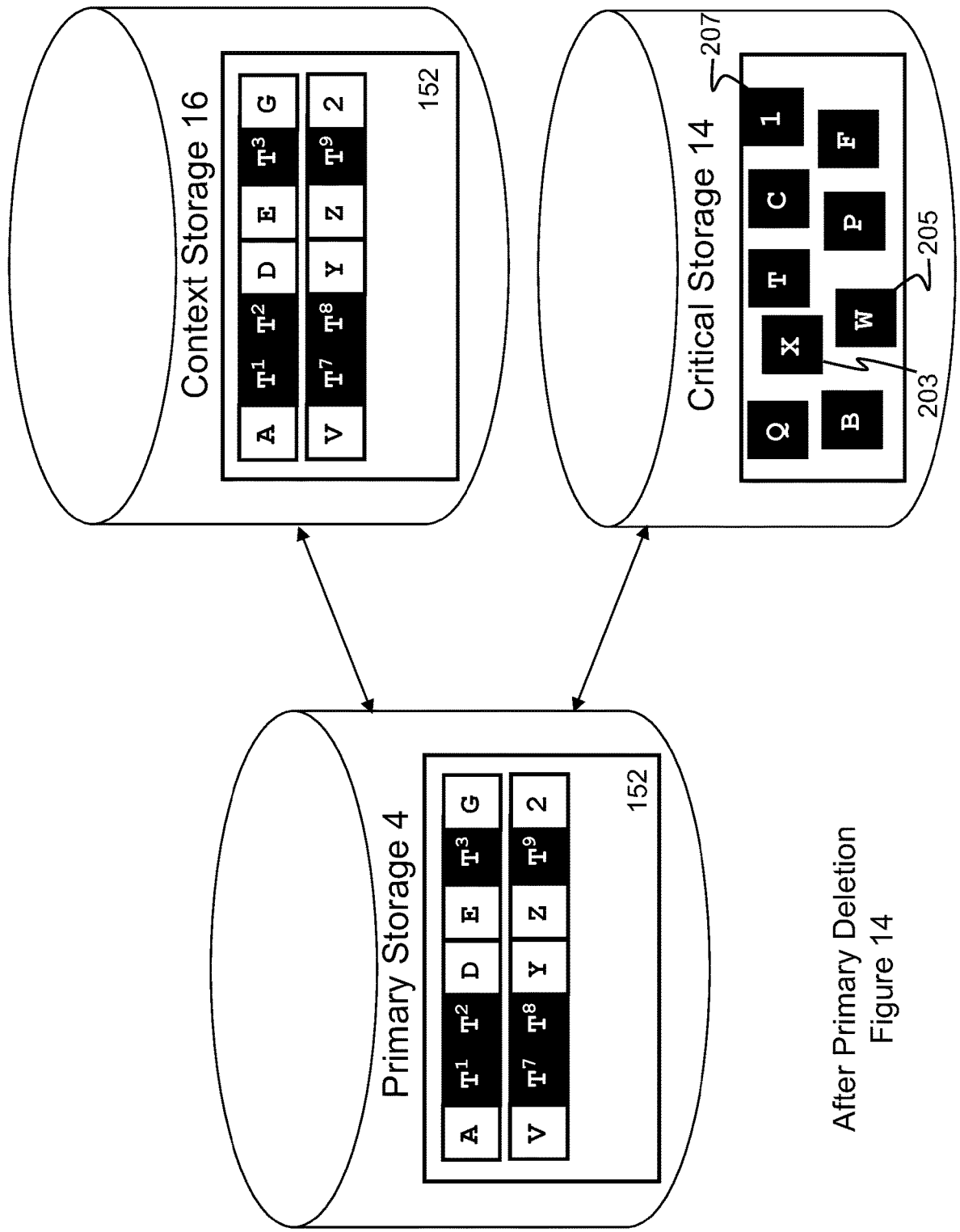
FIG. 14 illustrates a system state existing after execution of the Primary Deletion routine in accordance with one embodiment of the present invention.

Referring now to FIG. 13, a Primary Deletion routine 220 in accordance with an embodiment of the invention is illustrated. At 222 an Application 6 reads the Primary record stored in Primary Storage 4 to be deleted. Both the Primary and corresponding Context records are deleted 224, 226. FIG. 14 shows the effect of processing a Primary Deletion routine as compared to the contents of the Primary Storage 4 shown in FIG. 12. In this example, Primary record and corresponding Context record 211 have been deleted, but the corresponding fields 203, 205, 207 in Critical Storage 14 are not deleted.

Figure 15:
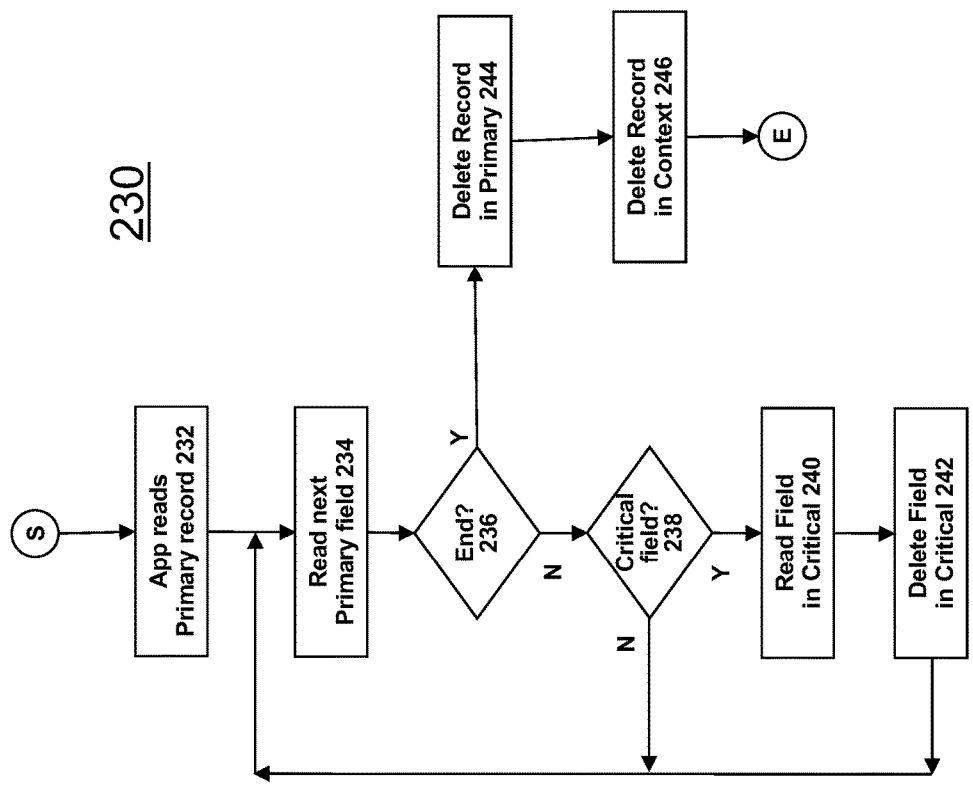
FIG. 15 is a flowchart that illustrates an Alternative Primary Deletion routine in accordance with one embodiment of the present invention.
Figure 16:
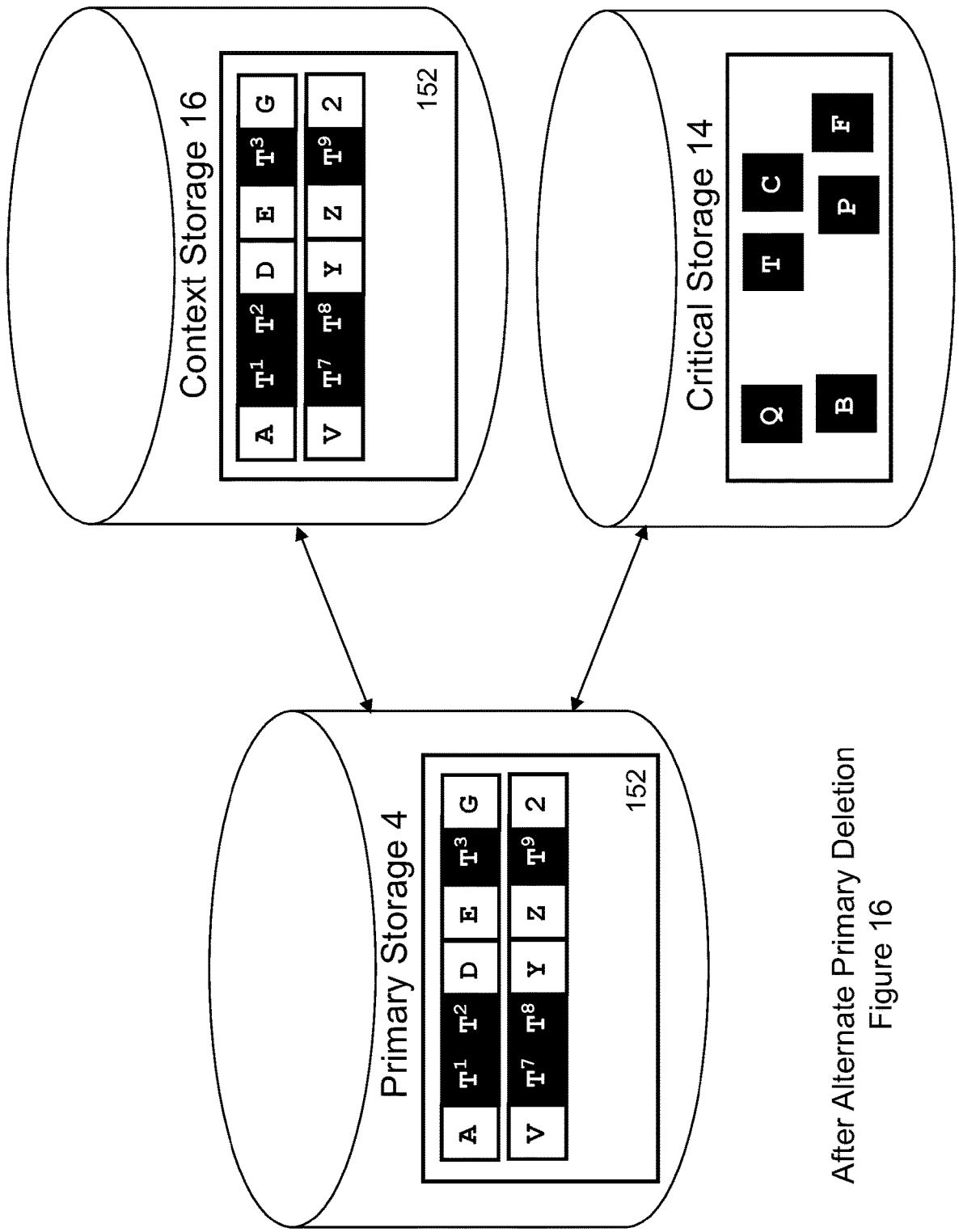
FIG. 16 illustrates a system state existing after execution of the Alternative Primary Deletion routine in accordance with one embodiment of the present invention.

FIG. 15 illustrates an alternate Primary Deletion routine 230 in accordance with a further embodiment of the invention. At 232 an Application 6 reads the Primary record stored in Primary Storage 4 to be deleted. Each Primary field in the record is examined 234. If the field is a Critical field, as indicated by the presence of a Tag 238, the corresponding Critical field in Critical Storage 14 is read 240 and then deleted 242, provided the Tag is not referenced by another record stored in Primary Storage 4 that is not being deleted. When all of the fields in the Primary record have been processed in this fashion, 236, the Primary and corresponding Context records are deleted 244, 246. FIG. 16 shows the effect of processing an alternate Primary Deletion routine as compared to the contents of the Primary Storage 4 shown in FIG. 12. The records 211 previously present in Primary Storage 4 and Context Storage 16 have been deleted as have the corresponding fields 203, 205, 207 in Critical Storage 14.

Figure 17:
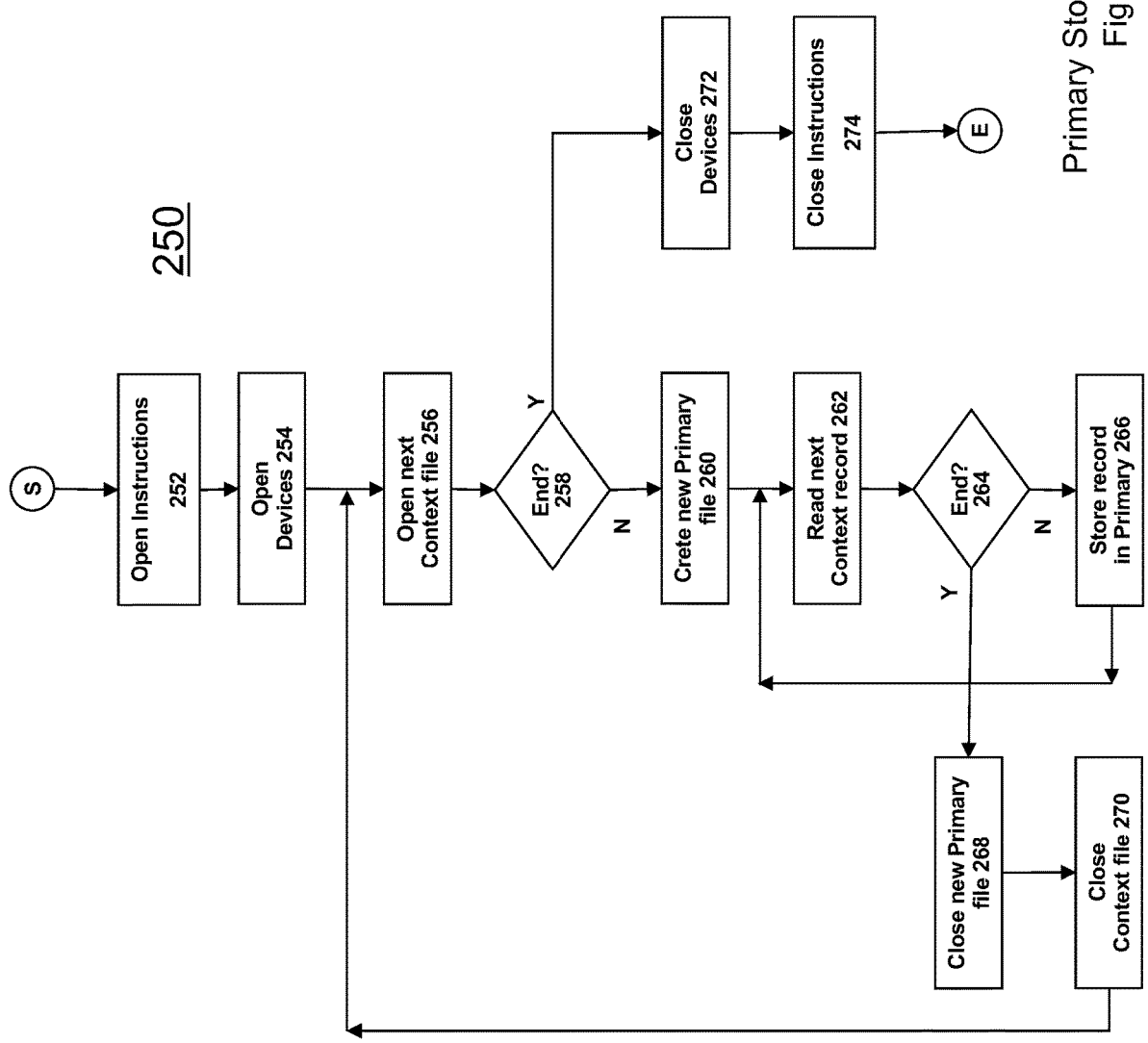
FIG. 17 is a flowchart that illustrates a Primary Storage Recovery routine in accordance with one embodiment of the present invention.

Referring now to FIG. 17, a Primary Storage Recovery routine 250 is shown. As noted above, the Backup Control Panel 8 uses Instructions 12 and Devices 2 to manage the Recovery Process. Accordingly, in Primary Storage Recovery routine 250, the Instructions are opened 252 as are the Devices 254. "Opening" in this context refers to an operation such as an "open" or "read" in which file contents are examined. Successful "opening" of such a file is indicative of the file not being corrupted in some fashion. The up-to-date contents of Context Storage 16 are then copied record-by-record for each file over to Primary Storage 4. As illustrated, for each Context file 256, 258, a new Primary file is created 260 and the Context records are copied to the new Primary record 262, 264, 266. Here too, the copying may involve actual examination of the file (e.g., using an "open" or "read" followed by a "store" procedure) so as to ensure the Context file is not corrupted. As each record is recreated in the Primary Storage 4, the new Primary file and the associated Context file are closed 268, 270. There is no need for processing Critical Storage 14 because the Tags in the Primary Storage records already point to the corresponding fields in Critical Storage, and these field contents are up-to-date. When all of the Context files have been processed 258, the Devices and Instructions are closed 272, 274.

Figure 18:
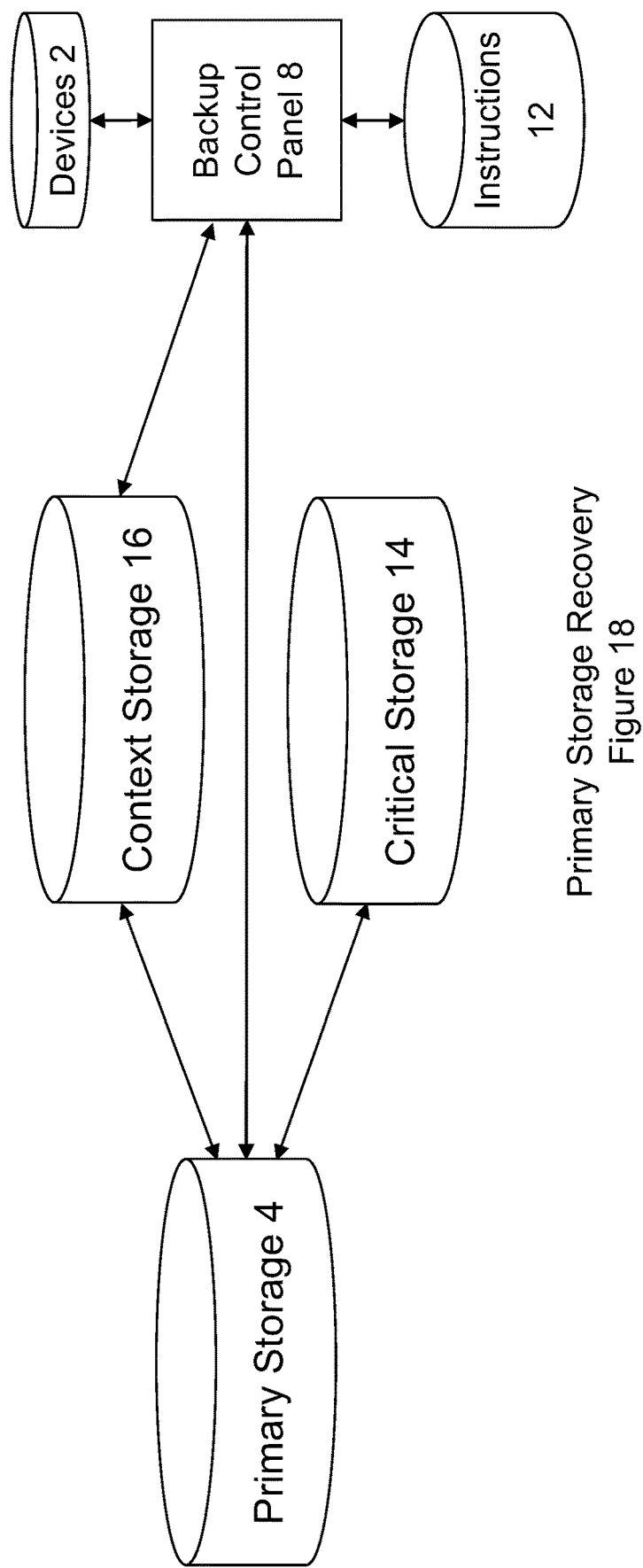
FIG. 18 illustrates a system configuration following execution of the Primary Storage Recovery routine in accordance with one embodiment of the present invention.
Figure 19:
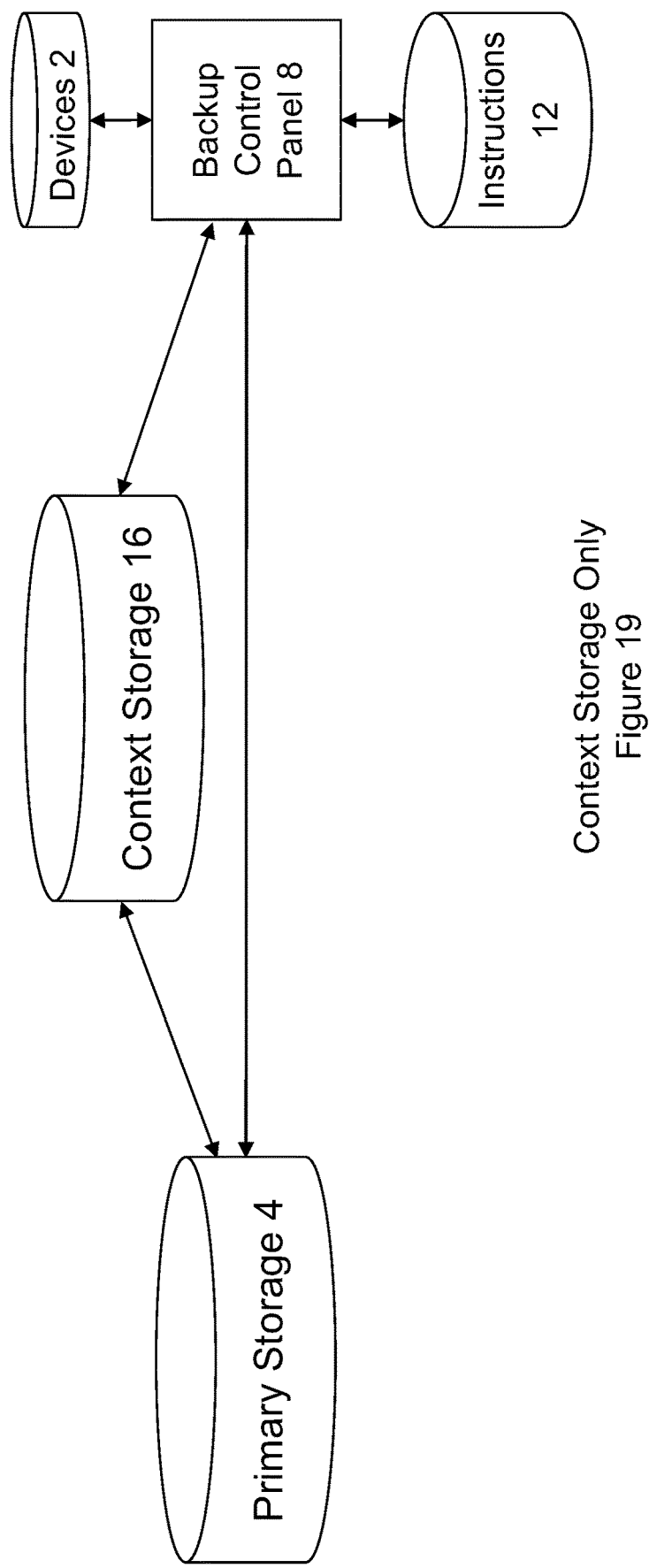
FIG. 19 illustrates a system configuration following execution of a Context Storage Only routine in accordance with one embodiment of the present invention.
Figure 20:
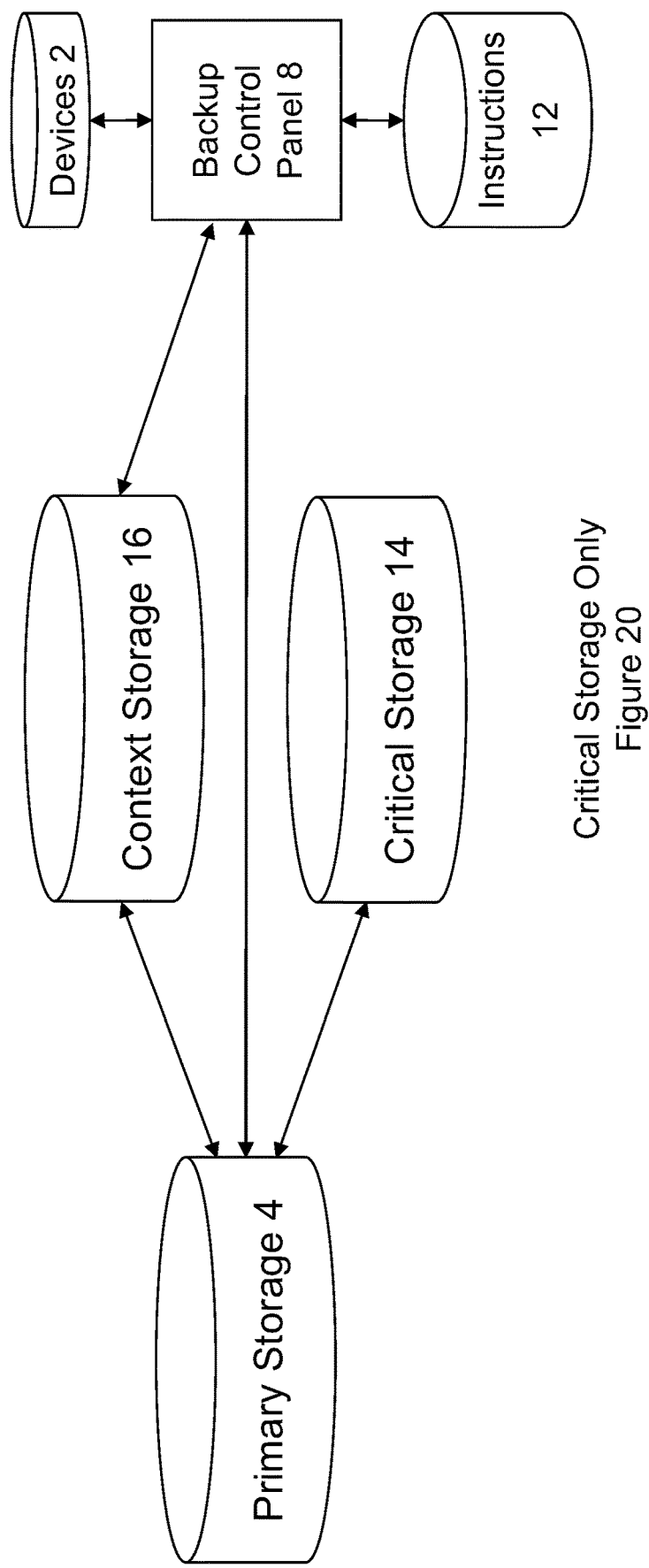
FIG. 20 illustrates a system configuration following execution of a Critical Storage Only routine in accordance with one embodiment of the present invention.

Referring to FIG. 18, one embodiment of the Primary Storage Recovery process is shown. With the help of Instructions 12 and Devices 2, the record-by-record copy of Context Storage 16 data is copied back to Primary Storage 4. In another embodiment, Context Storage 16 files are copied to Primary Storage 4. As shown in FIGS. 19 and 20, copying of Context Storage and Critical Storage contents may operate independently. For example, FIG. 19 illustrates a system configuration in which Context Storage 16 backs up all Primary Storage 4 in a manner that does not require Critical Storage. Such an embodiment is appropriate, for example, if there is no Critical data stored in Primary Storage 4. Referring to FIG. 20, where all Primary Storage 4 fields are considered to be Critical and are stored in Critical Storage 14, Context Storage 16 is nevertheless required. In this situation, Context Storage 16 will not contain data but rather just the Tags and thus the "context" for recovering the data in Critical Storage 14.

Figure 21:
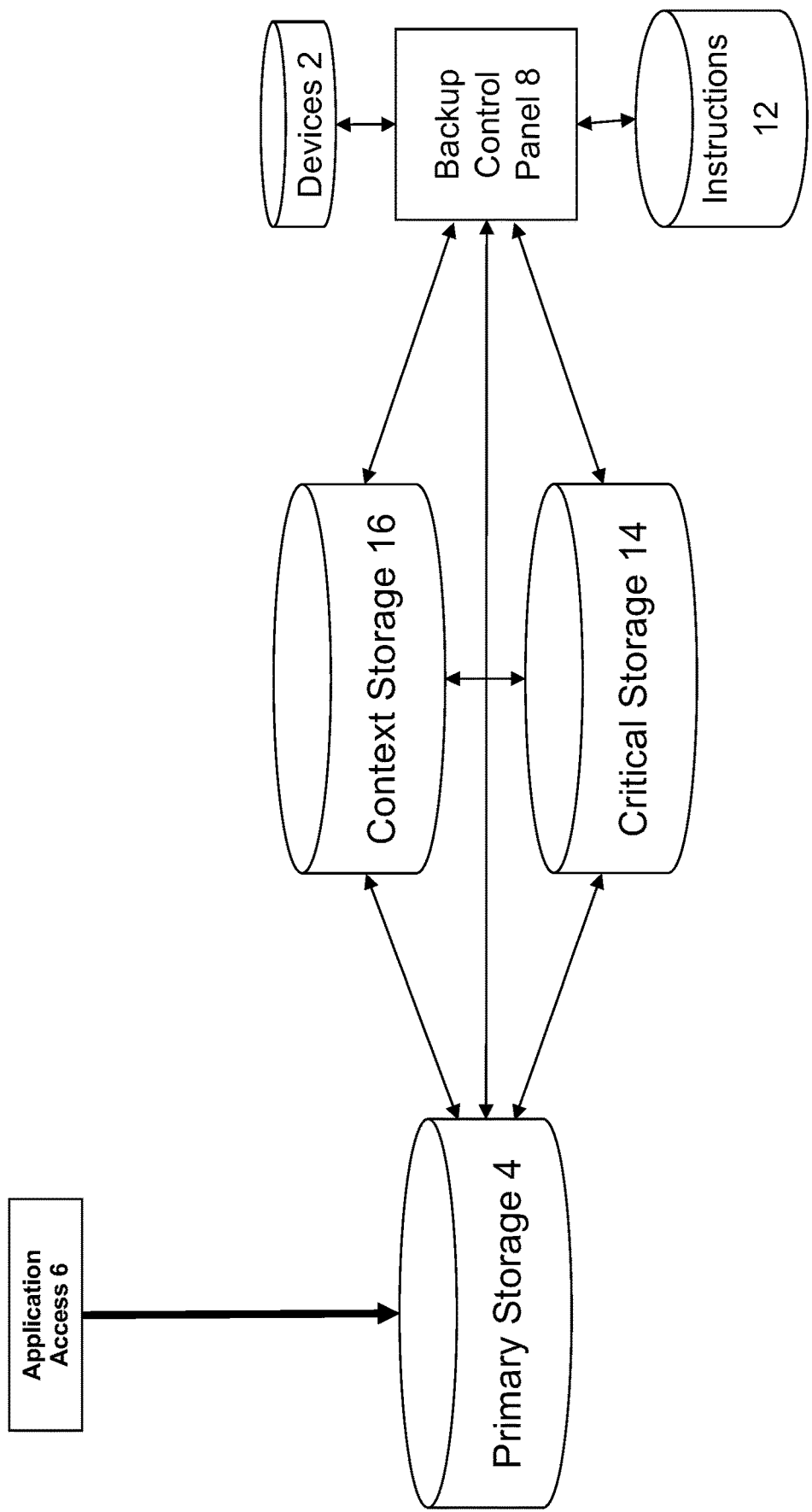
FIG. 21 illustrates a system configuration prior to a Failover Before Disruption in accordance with one embodiment of the present invention.
Figure 22:
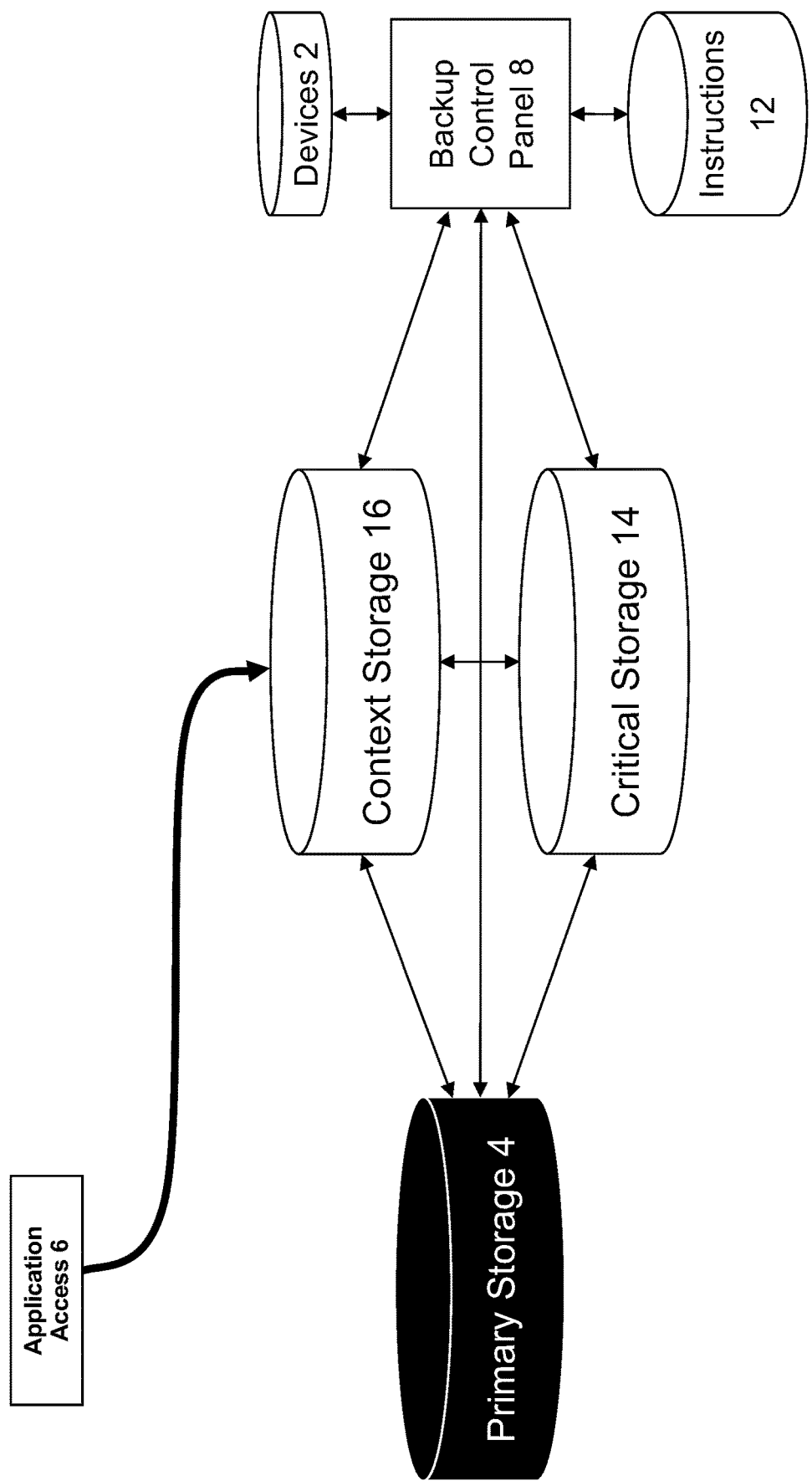
FIG. 22 illustrates a system configuration following a Failover After Disruption in accordance with one embodiment of the present invention.

The present invention can provide rapid recovery times from a ransomware attack or other disruption. Referring now to FIG. 21, Failover Before Disruption system configuration is shown. In this example, Context Storage 16 also contains operating systems, applications, drivers, and all other components required in a complete production environment. These make Context Storage 16 a self-contained system, and also facilitates the full restoration of Primary Storage 4. As shown in FIG. 22, when Primary Storage 4 becomes compromised (e.g., by a ransomware attack or other malicious action), the system adopts a Failover After Disruption configuration as shown, and Application Access 6 is automatically switched from Primary Storage 4 to Context Storage 16. Note that the Critical fields in Context Storage 16 are already synchronized to the corresponding Critical fields in Critical Storage 14. After Primary Storage 4 is reset or recovered, the records from Context Storage 16 may be copied back to Primary Storage 4 (e.g., again, this form of "copying" may involve examination of the files, records, and/or fields in the manner described above such that the ability to "open" and/or "read" the file/record/field is indicative of the file/record/field not being corrupted), at which time the Application 6 can access either Primary Storage 4 or Context Storage 16.

Referring now to FIG. 23, table 90 shows examples of Instructions with file and field definitions and a Critical Flag. In one embodiment, these Flags are automatically recommended, and are then reviewed and accepted or rejected by the Operator via Backup Control Panel 8.

Referring now to FIG. 24, table 92 shows examples of Device Definitions that contain descriptions and locations of Device files to be backed up and restored.

In another embodiment of the invention, and referring now to FIG. 25A, a sample medical record 300 stored in Primary Storage 4 is shown. In this example, all fields may be considered critical and stored in Critical Storage 14. Referring to FIG. 25B, the present invention provides granular control over such records so that an individual exercising his or her "Right to be Forgotten" may delete certain fields in Primary Storage 4 with the system nevertheless retaining additional information for further analysis, such as for medical research and doctor performance. This also enables the person to later undo a Right to be Forgotten request and have the information repopulated in a record.

What is claimed is:

1. A method, comprising:
   examining information concerning files stored in a primary storage device of a computer system to determine critical fields in said files;
   creating automated backup process instructions that segregate storage of said critical fields to a critical storage device and storage of non-critical fields and tags that are substituted for said critical fields in said files stored in said primary storage device to a context storage device;
   executing said instructions to effect storage of said critical fields to said critical storage device and storage of said non-critical fields and said tags to said context storage device; and
   following compromise of said files stored in said primary storage device, for each file stored in said context storage device, copying record-by-record said each file from said context storage device to said primary storage device.

2. The method of claim 1, wherein creating said automated backup process instructions includes reading said files and, for each file, determining whether the file's content can be secured.

3. The method of claim 1, wherein executing said instructions comprises, for each respective instruction of said instructions, and for each respective file of said files stored in said primary storage device,
   creating a corresponding context storage file in said context storage device, examining each record in the respective file and, for each respective record, examining each field in the respective record, and, if the respective instruction identifies the respective field as a critical field, adding its field contents to said critical storage device and replacing the field contents in the respective field of the respective record in the respective file stored in said primary storage device with one of said tags, otherwise, if the respective field is not a critical field, continuing with examination of a next field in the respective record in the respective file stored in said primary storage device; and
   when all fields of the respective record in the respective file stored in said primary storage device have been examined, if any of the fields of the respective record in the respective file stored in said primary storage device have had field contents replaced by said tags, updating the respective record in the respective file stored in said primary storage device, and thereafter, or if none of the fields of the respective record in the respective file stored in said primary storage device have had field contents replaced by said tags, adding the respective record to the corresponding context storage file.

4. The method of claim 1, further comprising, for each access of a respective file of said files stored in said primary storage device by an application, if a respective record of said respective file includes one of said tags, storing said tags in memory, examining each field of the respective record in the respective file and for each respective field if said respective field contains a respective tag of said tags, retrieving, using said respective tag to retrieve corresponding critical field content from said critical storage device and storing said critical field content in the respective field of said respective record of said respective file stored in said primary storage device.

5. The method of claim 4, further comprising, following said access of said respective file of said files stored in said primary storage device by said application, for each field of the respective record in the respective file that included one of said tags, updating said corresponding critical field content in said critical storage device and restoring from said memory said tags in said respective record of said respective file of said files stored in said primary storage device.

6. The method of claim 1, further comprising, for each access of a respective file of said files stored in said primary storage device by an application that creates a new record in said respective file, examining each field of the new record in the respective file and, for each respective field of the new record that includes critical field content, adding said critical field content to said critical storage device, replacing said critical field content in said new record of the respective file with one of said tags, and adding said new record with the one of said tags replacing said critical field content to said respective file in said context storage device.

7. The method of claim 1, further comprising, for each access of a respective file of said files stored in said primary storage device by an application that deletes a record in said respective file, deleting said record from said primary storage device, deleting a corresponding respective record of a corresponding respective file in said context storage device, but not deleting any critical field contents of said record in said critical storage device.

8. The method of claim 1, further comprising, for each access of a respective file of said files stored in said primary storage device by an application that deletes a record in said respective file, examining said record for any of said tags and, for each respective tag, deleting corresponding critical field content stored in said critical storage device, and deleting said record from said primary storage device and a corresponding respective record of a corresponding file in said context storage device.

9. The method of claim 1, further comprising following compromise of said files stored in said primary storage device, directing accesses by applications to said context storage device.

10. A computer system comprising:
    a primary storage device;
    a context storage device;
    a critical storage device;
    and
    a backup controller configured to:
       examine information concerning files stored in said primary storage device to determine critical fields in said files;
       based on said examination, create automated backup process instructions that segregate storage of said critical fields to the critical storage device and storage of non-critical fields and tags that are substituted for said critical fields in said files stored in said primary storage device to the context storage device
       execute said instructions to effect storage of said critical fields to said critical storage device and storage of said non-critical fields and said tags to said context storage device; and
       following compromise of said files stored in said primary storage device, for each file stored in said context storage device, copy record-by-record said each file from said context storage device to said primary storage device.

11. The computer system of claim 10, wherein said backup controller is configured to execute said instructions by, for each respective instruction of said instructions, and for each respective file of said files stored in said primary storage device, creating a corresponding context storage file in said context storage device, examining each record in the respective file and, for each respective record, examining each field in the respective record, and, if the respective instruction identifies the respective field as a critical field, adding its field contents to said critical storage device and replacing the field contents in the respective field of the respective record in the respective file stored in said primary storage device with one of said tags, otherwise, if the respective field is not a critical field, continuing with examination of a next field in the respective record in the respective file stored in said primary storage device; and when all fields of the respective record in the respective file stored in said primary storage device have been examined, if any of the fields of the respective record in the respective file stored in said primary storage device have had field contents replaced by said tags, updating the respective record in the respective file stored in said primary storage device, and thereafter, or if none of the fields of the respective record in the respective file stored in said primary storage device have had field contents replaced by said tags, adding the respective record to the corresponding context storage file.

12. The computer system of claim 10, wherein said backup controller is further configured to execute said instructions by, for each access of a respective file of said files stored in said primary storage device by an application, if a respective record of said respective file includes one of said tags, storing said tags in memory, examining each field of the respective record in the respective file and for each respective field if said respective field contains a respective tag of said tags, retrieving, using said respective tag to retrieve corresponding critical field content from said critical storage device and storing said critical field content in the respective field of said respective record of said respective file stored in said primary storage device.

13. The computer system of claim 12, wherein following said access of said respective file of said files stored in said primary storage device by said application said backup controller is further configured to execute said instructions by, for each field of the respective record in the respective file that included one of said tags, updating said corresponding critical field content in said critical storage device and restoring from said memory said tags in said respective record of said respective file of said files stored in said primary storage device.

14. The computer system of claim 10, wherein said backup controller is further configured to execute said instructions by, for each access of a respective file of said files stored in said primary storage device by an application that creates a new record in said respective file, examining each field of the new record in the respective file and, for each respective field of the new record that includes critical field content, adding said critical field content to said critical storage device, replacing said critical field content in said new record of the respective file with one of said tags, and adding said new record with the one of said tags replacing said critical field content to said respective file in said context storage device.

15. The computer system of claim 10, wherein said backup controller is further configured to execute said instructions by, for each access of a respective file of said files stored in said primary storage device by an application that deletes a record in said respective file, deleting said record from said primary storage device, deleting a corresponding respective record of a corresponding respective file in said context storage device, but not deleting any critical field contents of said record in said critical storage device.

16. The computer system of claim 10, wherein said backup controller is further configured to execute said instructions by, for each access of a respective file of said files stored in said primary storage device by an application that deletes a record in said respective file, examining said record for any of said tags and, for each respective tag, deleting corresponding critical field content stored in said critical storage device, and deleting said record from said primary storage device and a corresponding respective record of a corresponding file in said context storage device.

17. The computer system of claim 10, wherein following compromise of said files stored in said primary storage device, said backup controller is further configured to execute said instructions by directing accesses by applications to said context storage device.

* * * * *